US009296168B2

(12) United States Patent
Nguyen et al.

(10) Patent No.: US 9,296,168 B2
(45) Date of Patent: Mar. 29, 2016

(54) ARTICULATED MOLD ASSEMBLY AND METHOD OF USE THEREOF

(71) Applicant: NIKE, Inc., Beaverton, OR (US)

(72) Inventors: Thang Huy Nguyen, Ho Chi Minh (VN); Hung Van Vu, Cu Chi (VN)

(73) Assignee: NIKE, Inc., Beaverton, OR (US)

( * ) Notice: Subject to any disclaimer, the term of this patent is extended or adjusted under 35 U.S.C. 154(b) by 387 days.

(21) Appl. No.: 13/826,877

(22) Filed: Mar. 14, 2013

(65) Prior Publication Data

US 2014/0265016 A1 Sep. 18, 2014

(51) Int. Cl.
| | |
|---|---|
| *B29C 33/26* | (2006.01) |
| *B29C 45/32* | (2006.01) |
| *B29D 35/00* | (2010.01) |
| *B29C 45/17* | (2006.01) |
| *B29C 31/00* | (2006.01) |

(52) U.S. Cl.
CPC .......... *B29D 35/0081* (2013.01); *B29C 31/006* (2013.01); *B29C 45/1756* (2013.01); *B29C 45/32* (2013.01); *B29D 35/0036* (2013.01); *B29C 33/26* (2013.01)

(58) Field of Classification Search
CPC .......... B29D 35/0081; B29D 35/0036; B29C 2045/328; B29C 45/32; B29C 45/1756; B29C 33/26
USPC ...................................................... 425/129.2
See application file for complete search history.

(56) References Cited

U.S. PATENT DOCUMENTS

| | | | |
|---|---|---|---|
| 2,812,543 A | 11/1957 | Stacy | |
| 3,650,411 A * | 3/1972 | Reis | B21D 37/142 100/918 |
| 3,941,548 A | 3/1976 | Bruder | |
| RE30,130 E | 10/1979 | Edwards | |
| 4,329,867 A | 5/1982 | Nelson | |
| 4,354,819 A * | 10/1982 | Wirz | B29C 33/26 425/4 R |
| 4,360,335 A | 11/1982 | West | |
| 4,440,377 A * | 4/1984 | Hujik | B29C 33/26 249/110 |
| 4,556,191 A | 12/1985 | Mangogna | |
| 4,643,017 A | 2/1987 | Nelson | |

(Continued)

FOREIGN PATENT DOCUMENTS

EP 0841139 A2 5/1998

OTHER PUBLICATIONS

International Search Report issued in corresponding International Application No. PCT/US2014/021710, mailed May 30, 2014.

*Primary Examiner* — Robert B Davis
(74) *Attorney, Agent, or Firm* — Banner & Witcoff, Ltd.

(57) ABSTRACT

An apparatus for molding articles includes a first mold carrier configured to angularly displace relative to a fixed structure from a first molding position to first accessing position and a second mold carrier traveling with the first mold carrier and configured to angularly displace relative to the first mold carrier from a second molding position to a second accessing position. The first mold carrier may be pivotably coupled to the fixed structure; the second mold carrier may be slidably and rotatably coupled to the first mold carrier. A third mold carrier may be provided, and the second mold carrier may be located between the first and third mold carriers. An articulation mechanism may be provided to control relative motion of the second mold carrier relative to the first mold carrier as the first mold carrier pivots relative to the fixed structure. A method for molding articles is also provided.

14 Claims, 20 Drawing Sheets

(56) References Cited

U.S. PATENT DOCUMENTS

| | | | |
|---|---|---|---|
| 5,033,955 A * | 7/1991 | Faig | B29C 33/20 425/406 |
| 5,104,308 A | 4/1992 | Morton et al. | |
| 5,352,105 A | 10/1994 | Yang | |
| 6,113,382 A | 9/2000 | McNally | |
| 6,155,811 A | 12/2000 | Looije et al. | |
| 6,250,906 B1 | 6/2001 | Kodric | |
| 6,604,932 B2 | 8/2003 | Hagenmeyer | |
| 6,773,252 B2 | 8/2004 | Furuhata | |
| 7,128,565 B2 | 10/2006 | DiSimone et al. | |
| 7,232,299 B2 | 6/2007 | Marc | |
| 7,665,984 B2 | 2/2010 | Teng | |
| 7,699,216 B2 | 4/2010 | Smith et al. | |
| 2005/0144034 A1 | 6/2005 | Hunter | |
| 2006/0125134 A1 | 6/2006 | Lin | |
| 2007/0102843 A1 | 5/2007 | Waatti | |
| 2010/0242312 A1 | 9/2010 | Lim et al. | |

* cited by examiner

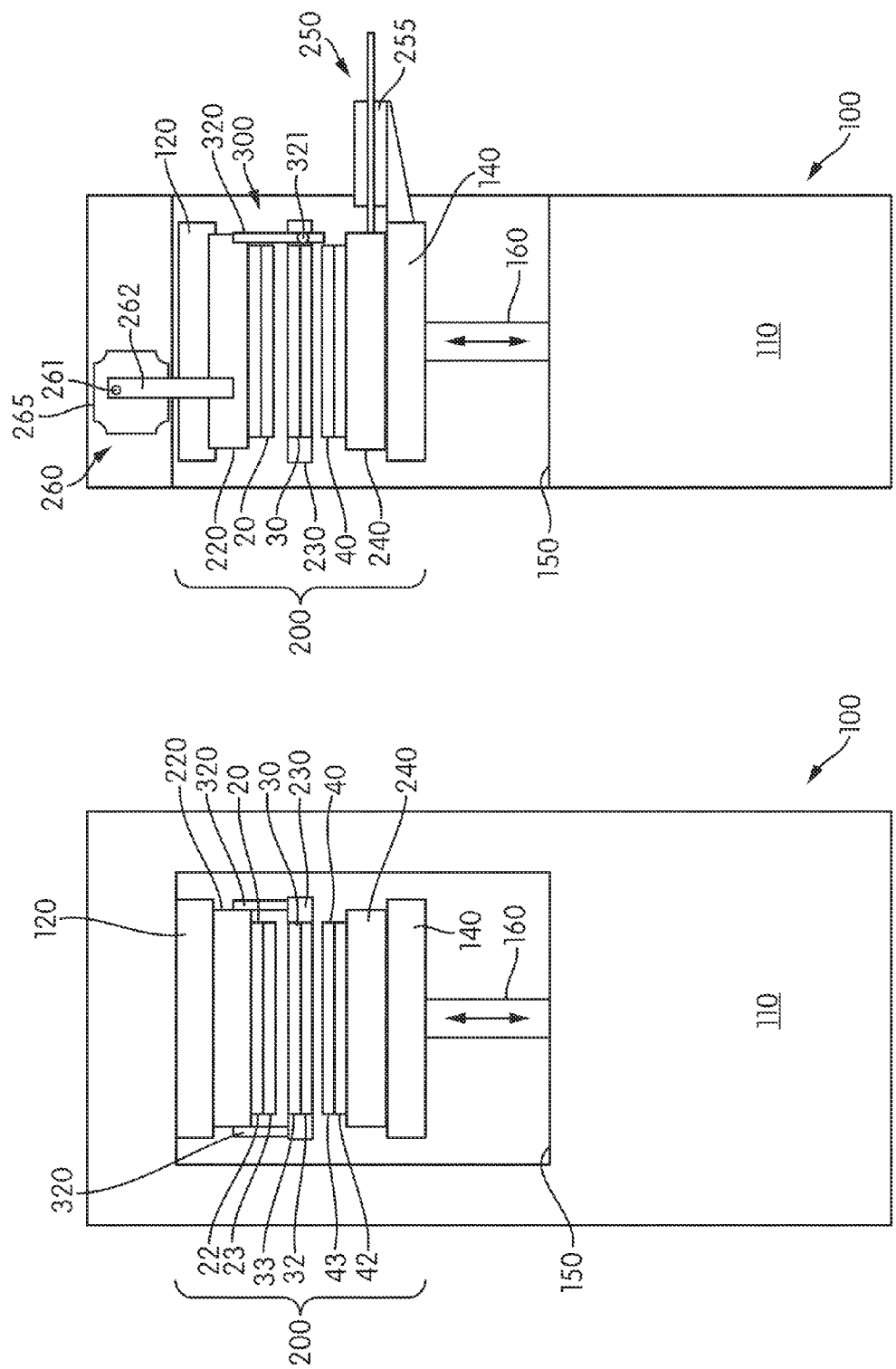

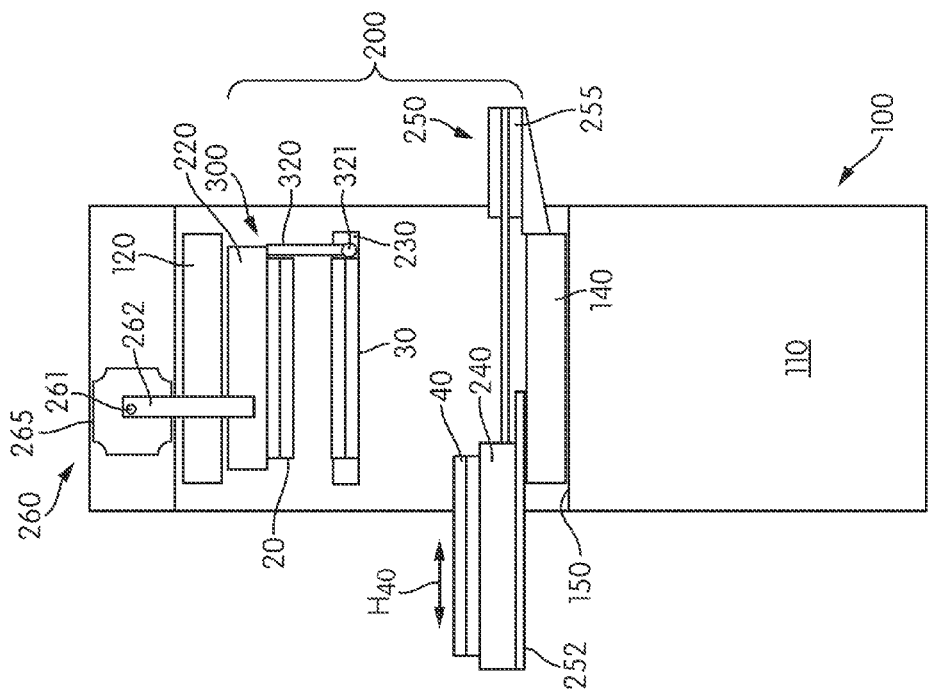
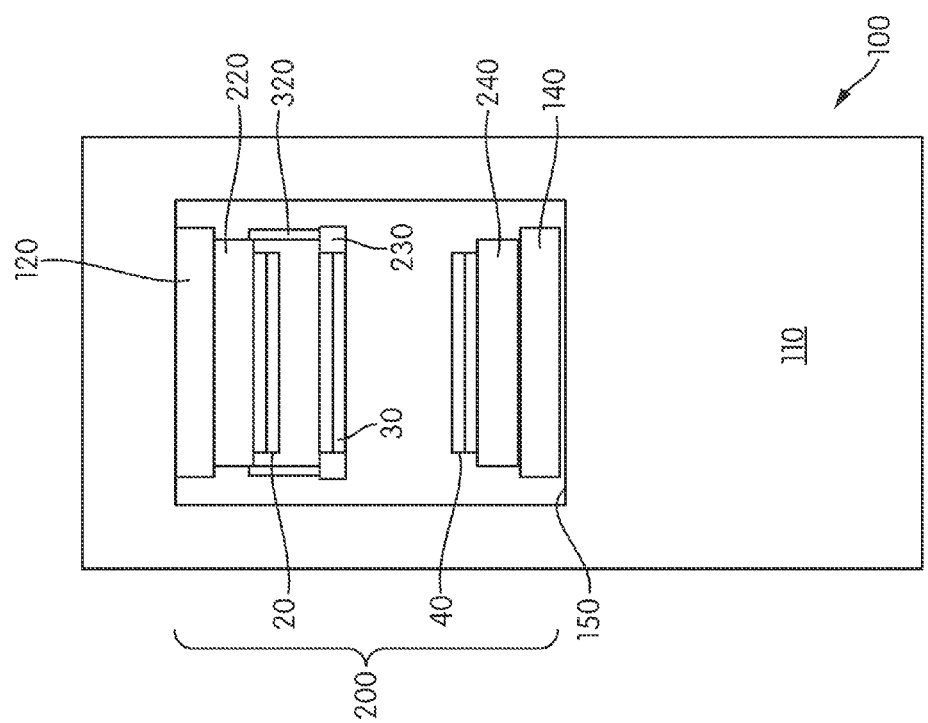
FIG. 5B
FIG. 5A

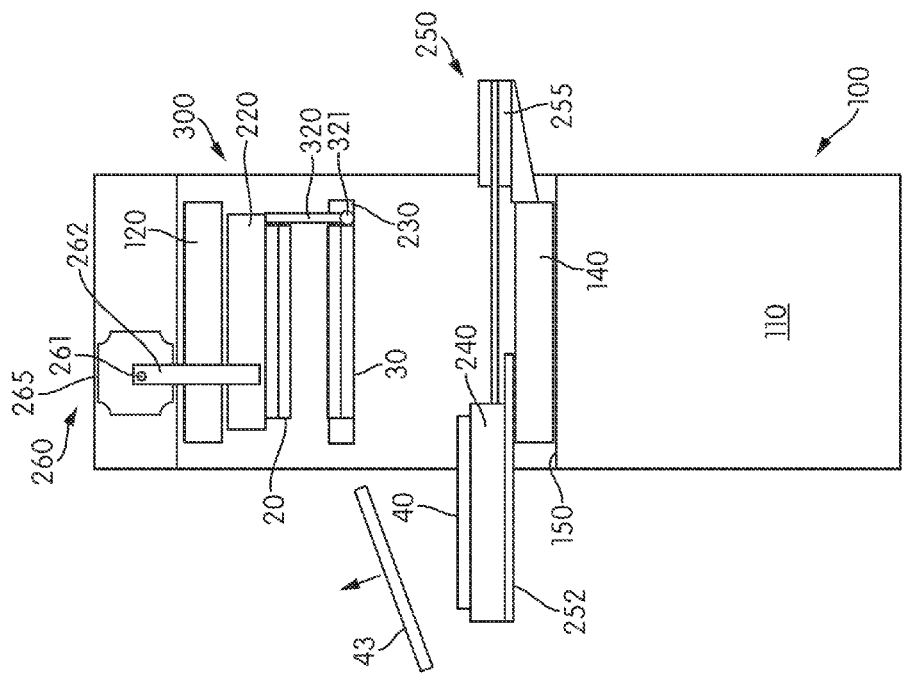
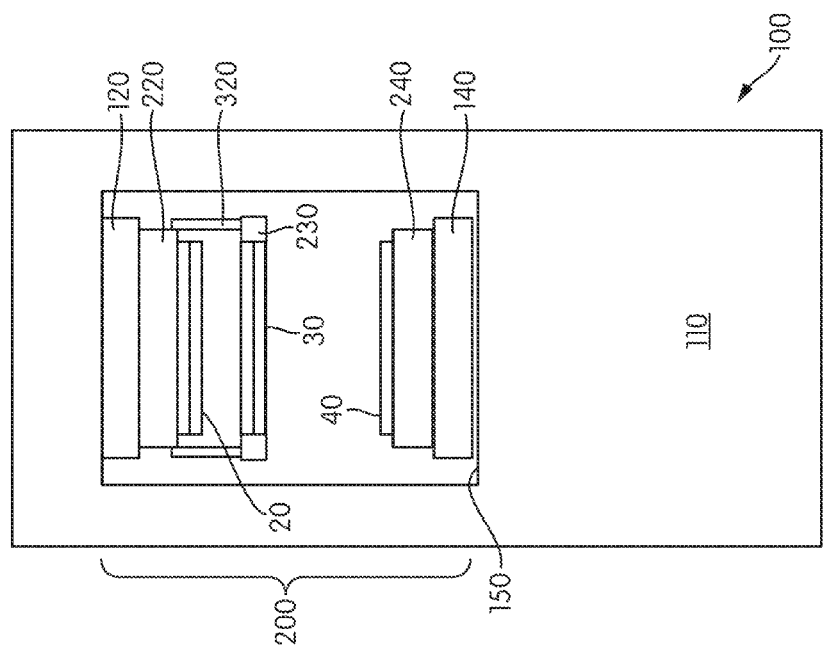
FIG. 6B
FIG. 6A

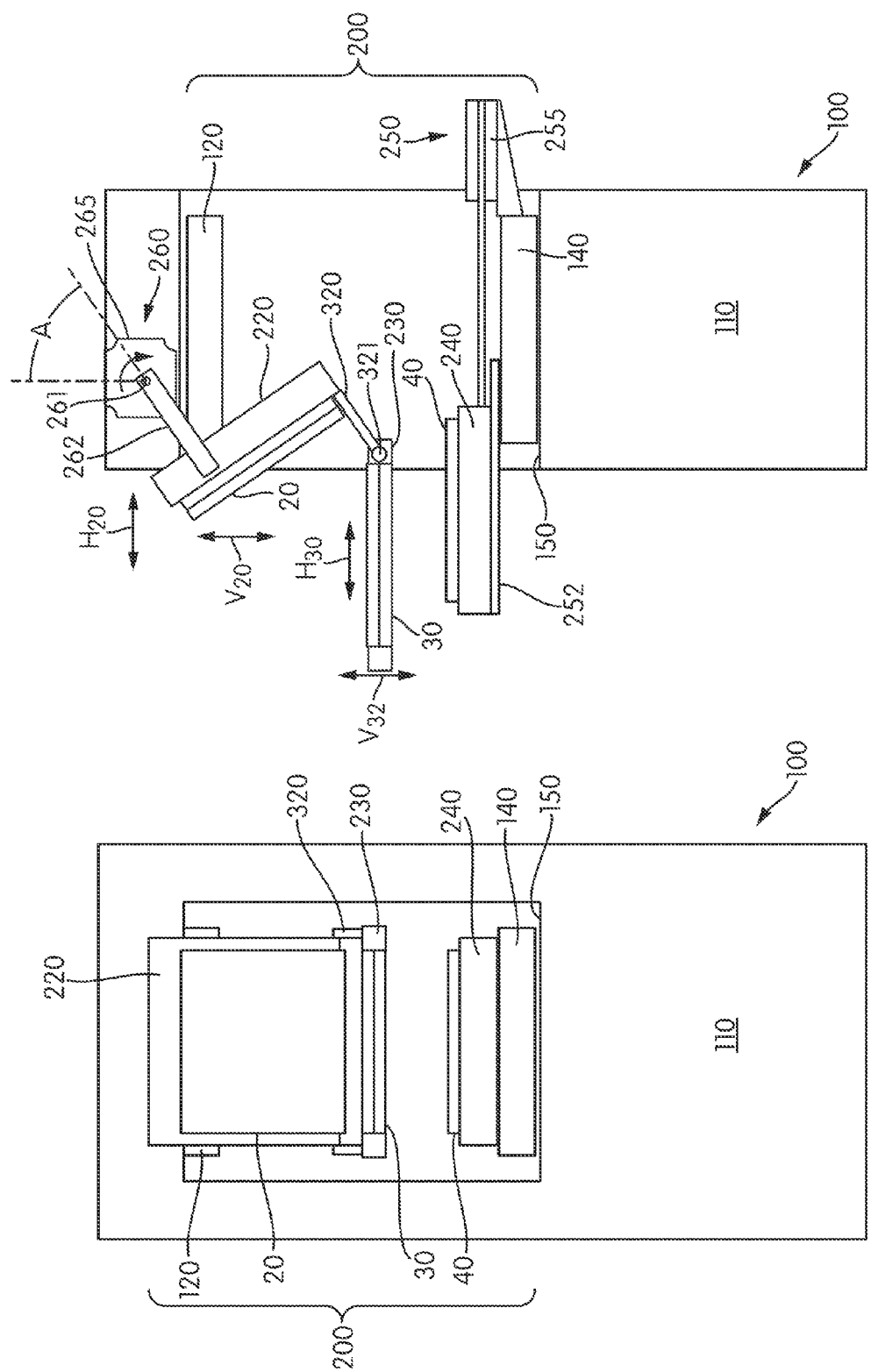

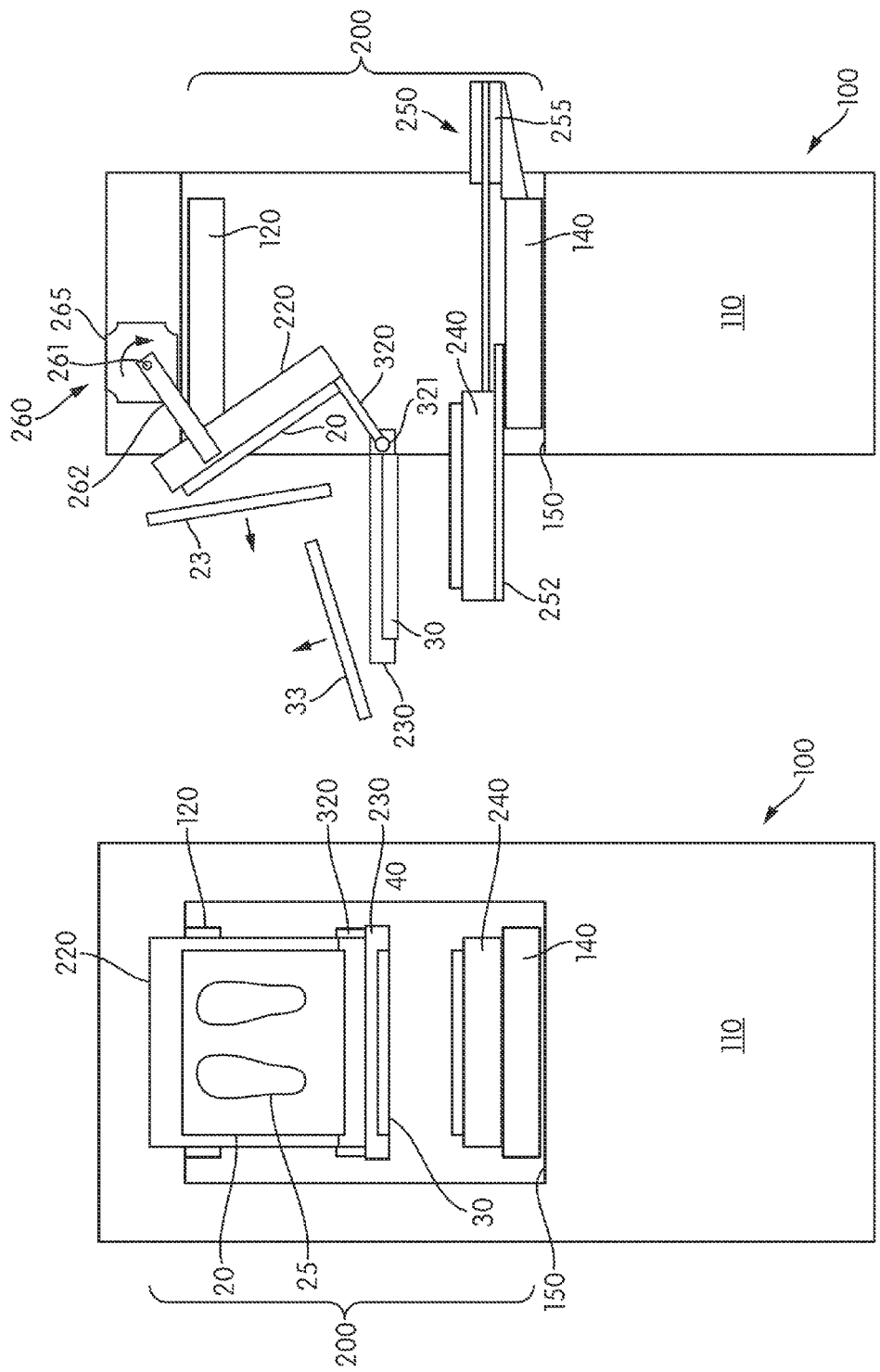

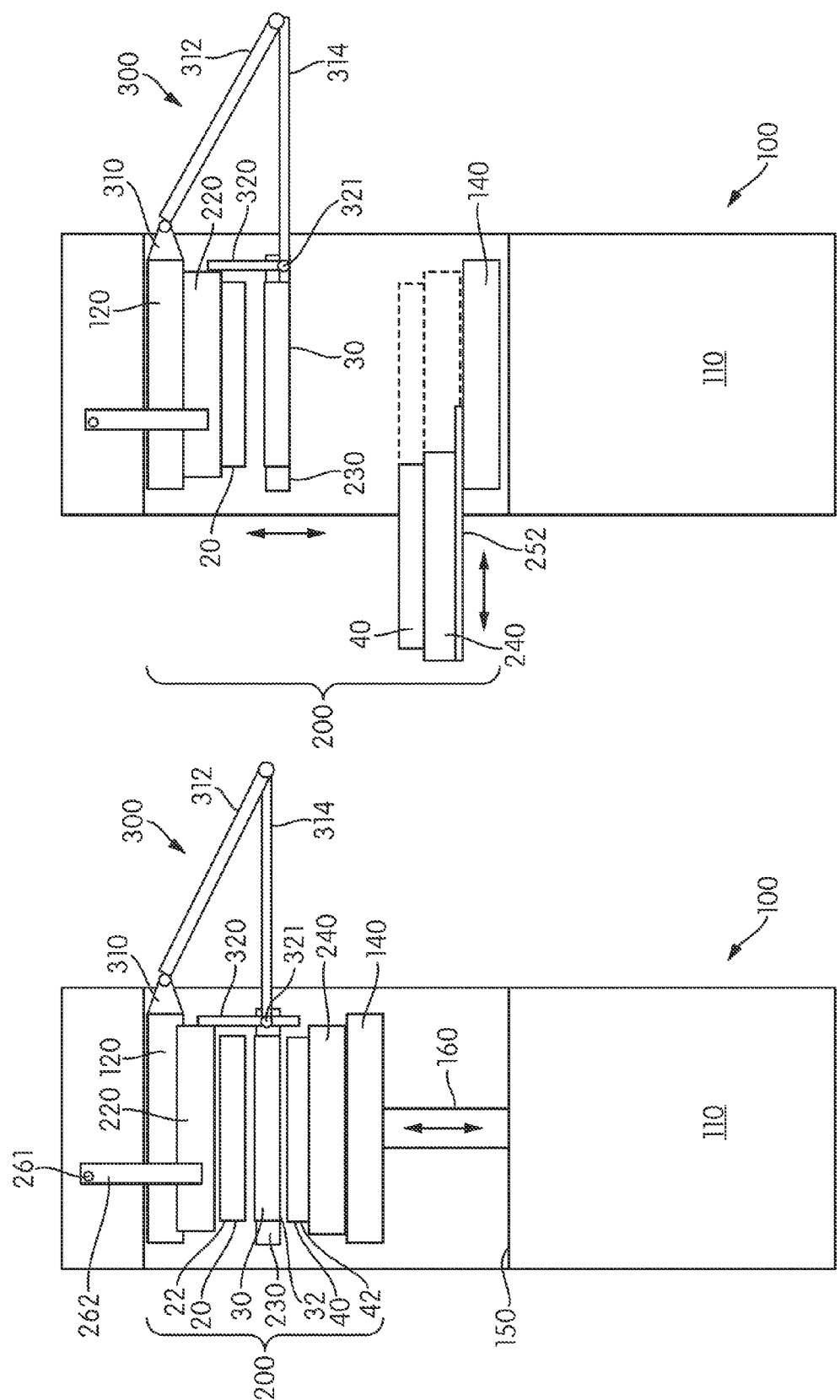

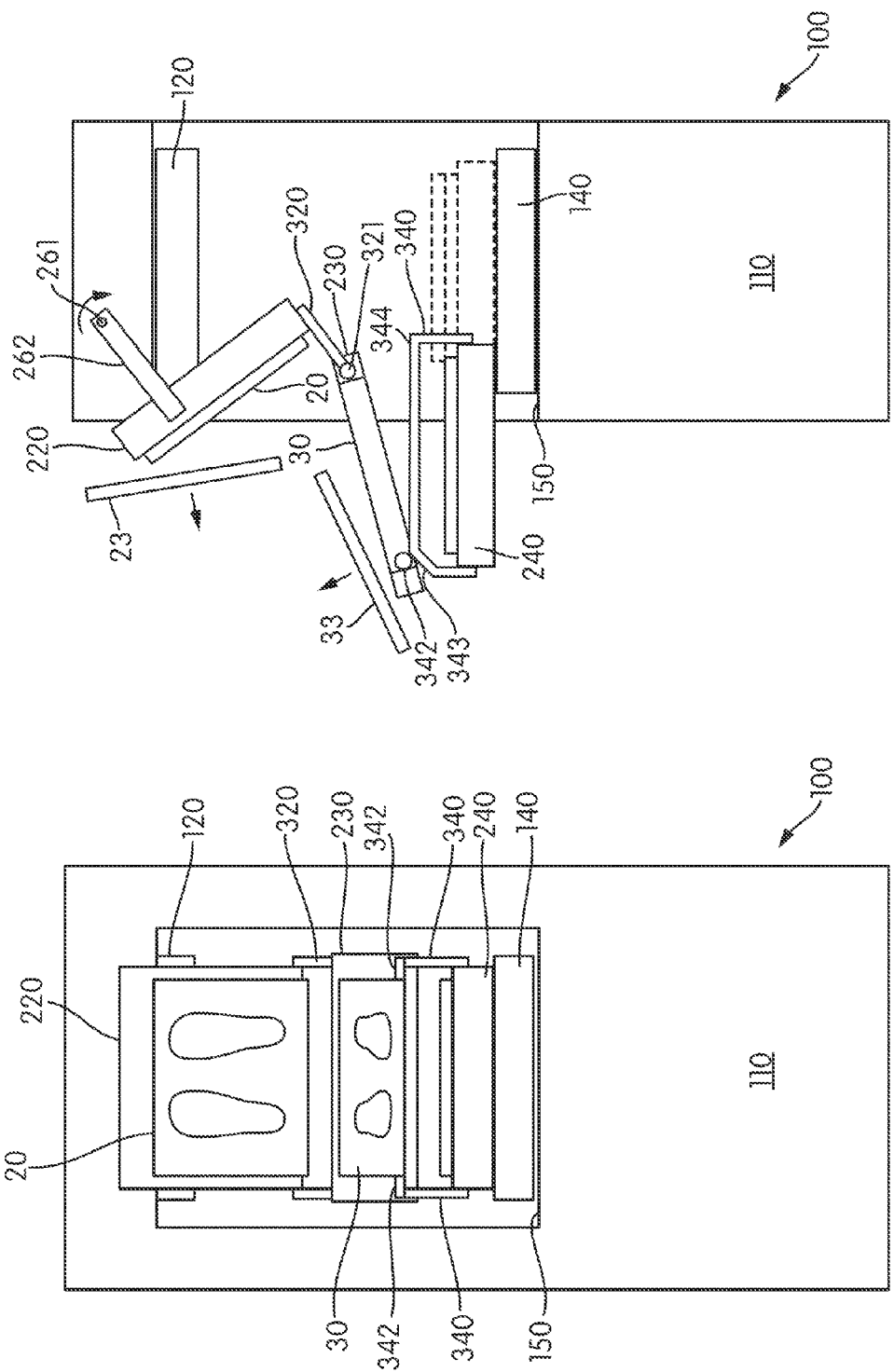

ARTICULATED MOLD ASSEMBLY AND METHOD OF USE THEREOF

FIELD OF THE INVENTION

This invention relates generally to a mold assembly, and, in particular, to an articulated mold assembly. The mold assembly may be used to manufacture soles or other components for articles of footwear.

BACKGROUND

Molding machines are commonly used in the manufacturing industry. A variety of methods are known for molding components, including injection molding and compression molding. In conventional injection molding, heated polymeric material is forced into a mold cavity and allowed to cool, thereby giving the polymeric material its final shape. In conventional compression molding, material is placed in an open mold cavity. The mold is closed and pressure is applied to force the material to flow within the mold cavity. Typically, heat is also applied to assist the flow of the material throughout the mold cavity. The heat and pressure are maintained until the molding material has cured.

Molds for making soles or other components for articles of footwear are well known. Such molds may be formed of a first plate and a second plate that cooperate with one another to define one or more cavities or recesses. For example, the mold plates may define cavities for left and right soles such that both soles may be simultaneously formed in a single molding operation. The first plate may define the lower topography of the molded components. The second plate may define the upper topography of the molded components.

Typically the mold plates are located within molding machines that apply pressure and/or heat to the mold assembly. Such machines, with their moving parts and capability to apply very large pressures, are inherently dangerous to people working in their vicinity. Mold operators typically interact with the mold machines to load and unload the mold cavities. In order to promote the health and safety of the mold assembly operators various features have been introduced. For example, mold trays that move out from between the pressure-applying platens allow the operator to safely remove molded components from the mold cavities and/or refill the mold cavities without working between the platens. Further, mold trays that move toward the operator are designed to allow a more ergonomic interaction as the mold cavities are emptied or filled. These various safety and ergonomic features generally require additional mold assembly components, which may be quite complicated, to drive, engage, align, lock, etc. the various mold plates. Further, these various features generally require additional clearances and larger molding machines to accommodate the movements of the various components.

A molding apparatus that reduces or overcomes some or all of the difficulties inherent in prior known devices, while providing reliable, simple, economical and fast operation, is desirable. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to provide an apparatus for molding articles. The molding apparatus has a first mold carrier configured to angularly displace relative to a fixed structure from a first molding position to an accessing position. The molding apparatus further has a second mold carrier configured to angularly displace relative to the first mold carrier from a second molding position to a second accessing position. The second mold carrier travels with the first mold carrier as the first mold carrier angularly displaces relative to the fixed structure. Further, the second mold carrier may be configured to slide apart from or otherwise linearly displace from the first mold carrier. Thus, the second mold carrier may be both slidably and rotatably coupled to the first mold carrier.

Additionally, a third mold carrier configured to move from a third molding position in a first direction toward the first mold carrier when the first mold carrier is in the first molding position and configured to move in a second direction transverse to the first direction to a third accessing position may be provided. The second mold carrier may be located between the first mold carrier and the third mold carrier when the first mold carrier is in the first molding position and when the third mold carrier is in the third molding position.

In certain embodiments, a first platen and a second platen may be provided. In the molding configuration or position, the mold carriers may be located within a platen volume defined between the first and second platens. In the accessing configuration or position, at least some of the mold carriers may be located at least partially outside the platen volume.

According to some aspects, an articulation mechanism may be provided to control the relative motion of the second mold carrier relative to the first mold carrier as the first mold carrier pivots relative to the fixed structure. The articulation mechanism includes a connecting member coupled to the first and second mold carriers and configured to allow relative linear displacement therebetween. The articulation mechanism may include at least two linkage members extending between the fixed structure and the second mold carrier. Further, the articulation mechanism may include a rotation joint between the connecting member and the second mold carrier.

According to certain embodiments, a displacement guide member may be provided on the third mold carrier and a complementary guided element may be provided on the second mold carrier. This complementary guided element may be configured for relative displacement along the displacement guide member.

The principles of the invention may be used to provide an apparatus for molding articles having a fixed structure and an articulated mold assembly attached thereto. The articulated mold assembly includes at least one mold carrier rotatably coupled to a pivotable member. The pivotable member is configured to be pivoted around a first axis associated with a fixed structure. The at least one mold carrier is rotatably coupled around a second axis associated with the pivotable member, wherein the second axis is distinct from the first axis. According to certain aspects, the second axis may be slidably coupled to the pivotable member.

The articulated mold assembly may be provided between platens. A movable platen configured to move in a first direction toward a fixed platen may be provided. Further, according to certain embodiments, an upper mold carrier may be attached to the pivotable member and a lower mold carrier may be attached to the movable platen. The lower mold carrier may be configured to move relative to the movable platen in a direction transverse to the first direction.

The principles of the invention may be further used to provide a method of molding articles using a molding machine. The method includes moving the first mold portion from a molding orientation within a molding volume to an access orientation at least partially outside the molding volume. The step of moving the first mold portion includes pivoting the first mold portion around a first axis associated with the fixed structure and rotating the first mold portion around a second axis distinct from the first axis. The step of pivoting may include pivoting a pivotable member around the first axis, and the second axis may be associated with the pivotable member. The second axis may be linearly displaced relative to the first axis during the step of moving.

The method may further include introducing a material into a first mold cavity provided at least partially within the first mold portion and shaping the material to form a first molded article. The material may be introduced by injection molding. Optionally, the material may be introduced, for example, as a compression molding blank or other material charge, when the mold cavity is open and accessible. The molded article may be a component of an article of footwear. Pressure may be applied to the first mold portion during the shaping step.

According to certain embodiments, a second mold portion and/or a third mold portion may also be moved from a molding orientation within the molding volume to an access orientation at least partially outside the molding volume. The step of moving the second mold portion may include pivoting the second mold portion around the first axis. The step of moving the third mold portion may include horizontally displacing the third mold portion.

The method may be used to perform a two-stage molding process to thereby manufacture molded articles having two different materials.

Substantial advantage is achieved by providing a mold assembly with an articulated mold portion. In particular, certain embodiments allow safe and ergonomic access to the mold cavities. Aspects of this invention also help reduce manufacturing costs and setup time associated with producing molded parts, including components for footwear.

Further, providing a mold assembly with an articulated mold portion will advantageously increase the molding capacity and thereby increase the number of parts that may be molded during any single molding process. As one example, for a given molding machine's working volume, the molding capacity may be doubled.

These and additional features and advantages of the invention disclosed here will be further understood from the following detailed disclosure of certain preferred embodiments.

BRIEF DESCRIPTION OF THE DRAWINGS

FIG. 3A is a schematic front view of a molding machine in a closed-mold configuration according to an embodiment of the invention. FIG. 3B is a schematic side view of the molding machine of FIG. 3A.

FIG. 5A is a schematic front view of the molding machine of FIGS. 3A and 3B in a partially open-mold configuration with a lower mold carrier located at least partially outside of the platen volume. FIG. 5B is a schematic side view of the molding machine of FIG. 5A.

FIG. 6A is a schematic front view of the molding machine of FIGS. 3A and 3B in a partially open-mold configuration with a lower mold carrier located at least partially outside of the platen volume with an optional auxiliary plate and/or a molded component removed from the lower mold carrier. FIG. 6B is a schematic side view of the molding machine of FIG. 6A showing the optional auxiliary plate and/or a molded component being removed from the lower mold carrier.

FIG. 7A is a schematic front view of the molding machine of FIGS. 3A and 3B in a fully open-mold configuration with a lower mold carrier, an upper mold carrier, and a middle mold carrier located at least partially outside of the platen volume. FIG. 7B is a schematic side view of the molding machine of FIG. 7A.

FIG. 8A is a schematic front view of the molding machine of FIGS. 3A and 3B in a fully open-mold configuration with a lower mold carrier, an upper mold carrier, and a middle mold carrier located at least partially outside of the platen volume with an optional auxiliary plate and/or a molded component removed from the lower mold carrier, the upper mold carrier and the middle mold carrier. FIG. 8B is a schematic side view of the molding machine of FIG. 8A showing the optional auxiliary plate and/or a molded component being removed from the upper mold carrier and the middle mold carrier.

FIG. 10 is a schematic side view of a molding machine in a substantially closed-mold configuration according to an embodiment of the invention.

FIG. 11 is a schematic side view of the molding machine of FIG. 11 in a partially open-mold configuration with a lower mold carrier located at least partially outside of the platen volume and with an optional auxiliary plate and/or a molded component being removed from the lower mold carrier.

FIG. 17A is a schematic front view of the molding machine of FIGS. 13A and 13B in a fully open-mold configuration with a lower mold carrier, an upper mold carrier, and a middle mold carrier located at least partially outside of the platen volume with an optional auxiliary plate and/or a molded component removed from the lower mold carrier, the upper mold carrier and the middle mold carrier. FIG. 17B is a schematic side view of the molding machine of FIG. 17A showing the optional auxiliary plate and/or a molded component being removed from the upper mold carrier and the middle mold carrier.

Figure 1:
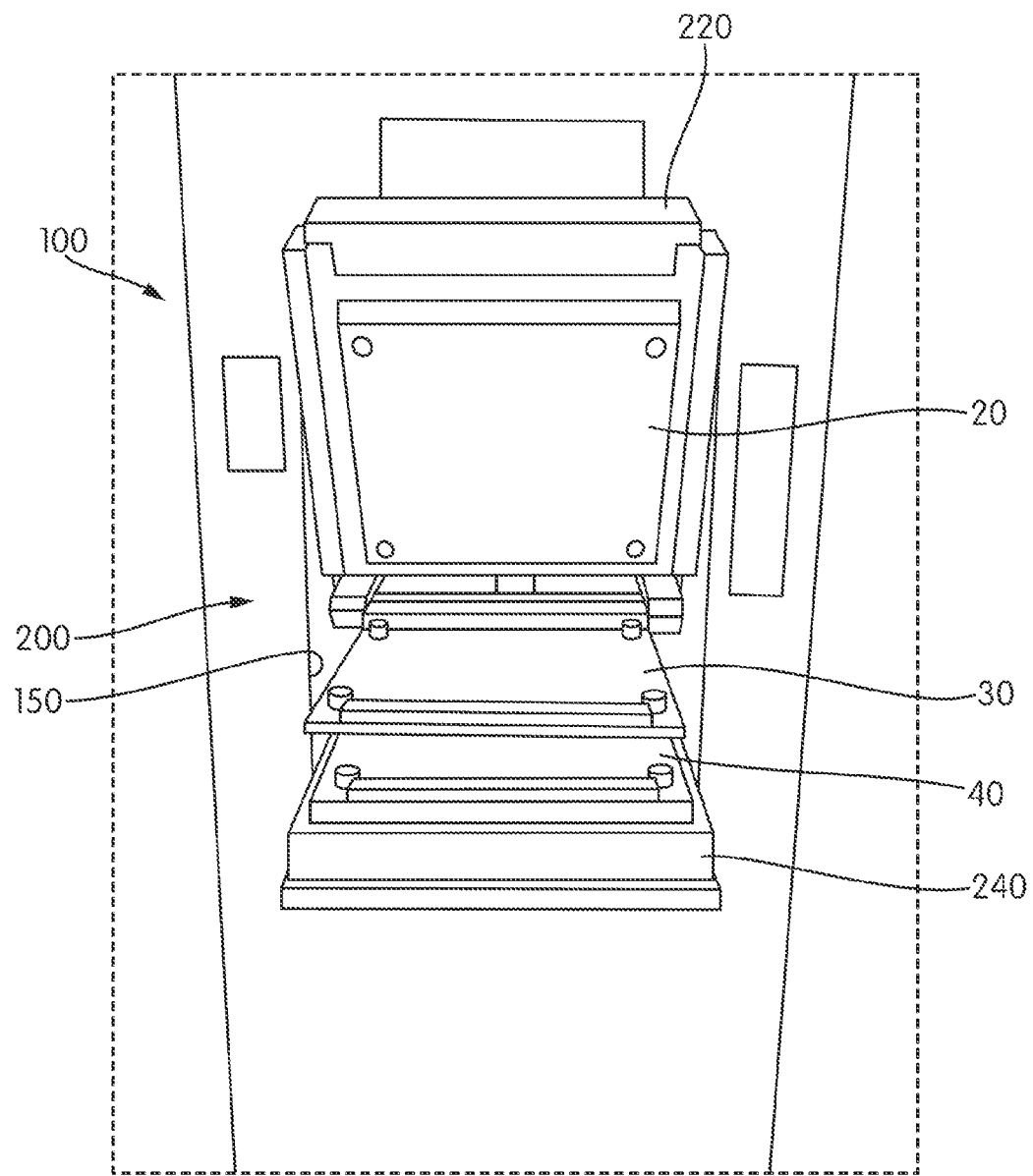
FIG. 1 is a front perspective view of a molding machine with a molding assembly in accordance with aspects of the invention.

The figures referred to above are not drawn necessarily to scale and should be understood to provide a representation of the invention, illustrative of the principles involved. Some features of the mold assembly depicted in the drawings may have been enlarged or distorted relative to others to facilitate explanation and understanding. The same reference numbers are used in the drawings for similar or identical components and features shown in various alternative embodiments. Mold assemblies with a movable center mold portion as disclosed herein would have configurations and components determined, in part, by the intended application and environment in which they are used.

DETAILED DESCRIPTION

The present invention relates, in general, to a molding machine having a working volume. According to certain aspects, the molding machine may have upper and lower platens and a drive unit for moving at least one of the platens relative to the other between an open position and a closed position. The working volume may be defined as the volume between the platens. A molding assembly may be provided between the platens or at least partially between the platens. The molding assembly may include mold portions that define one or more mold cavities. The mold portions are located between the platens and are pressed together in a closed molding configuration when the platens are closed. When the platens are in an open position, the molding portions may be opened or exposed to allow an operator to remove the molded parts from and/or to place molding material into the mold cavities. The mold portions may be located between, supported by, and/or coupled (directly or indirectly, fixedly or movably) to the platens. In some embodiments, the molding assembly may also include one or more mold carriers, which in turn support the mold portions. As such, the mold carriers may be located between, supported by, and/or coupled (directly or indirectly, fixedly or movably) to the platens.

The drive unit for moving the platens may be a hydraulic drive, a mechanical drive (e.g., ball screws), an electrical drive, a pneumatic drive or any other drive as would be known to persons of ordinary skill in the art. The platen drive unit provides the clamping force between the platens and thus between the mold portions. Further, the platen drive unit, in conjunction with the platen drive mechanism of the molding machine, defines the length of the opening and closing stroke. When combined with the cross-section area (i.e., the footprint) of the platens, the length of the opening stroke effectively defines the available working volume or platen volume for accommodating the molding assembly.

A molding assembly is generally located, at least partially, between the upper and lower platens of the molding machine. The molding assembly may include one or more mold carriers. Each mold carrier may include means for attaching and detaching a mold plate or mold portion to the carrier. Each mold carrier may include heating and/or cooling means. Each mold carrier may include sensors (temperature, pressure, displacement, etc.) and/or switches for assisting in the control of the molding process and the safe operation of the molding machine. Each mold carrier may include alignment or guiding means, locking means, sealing means, stop means, etc. to assist in the proper movement, alignment, and mating of the mold portions. Further, each mold carrier may include ejection means for assisting in the removal of the molded parts from the mold cavities.

Various components of the molding assembly may be movable from molding positions and molding orientations within the platen or working volume to accessing positions and accessing orientations outside the platen volume or at least partially outside the platen volume. According to certain embodiments, a mold portion or a mold carrier may be configured to pivot, rotate and/or translationally displace relative to the fixed structure from a molding position to an accessing position. Further, a mold portion or a mold carrier may be configured to pivot, rotate and/or translationally displace relative to another mold portion or mold carrier from a molding position to an accessing position.

As used herein, the terms "pivot," "pivoting," "pivotable," and the like refer to rotational movement that involves an arm, rod, shaft or other element on which a component or related part rotates or swings around an axis that is removed from the component. As such, the component or related part pivots around an axis that does not lie within the part. In other words, a pivoted component not only experiences angular displacement or rotation, but also experiences translational motion with respect to the pivot axis. The terms "rotate," "rotating," "rotatable," and the like refer to angular displacement around an axis or center without use of an intervening pivot arm. In other words, the axis of rotation extends through the component or part that is being rotated. As such, items that "rotate" around an axis would experience angular displacement with respect to the axis of rotation without being displaced from the axis. An axis around which any given component pivots or rotates may be fixed or attached to the fixed structure or the axis may be fixed or attached to an articulated member as disclosed below.

Positioning the components outside the platen volume allows an operator to safely and efficiently access the mold portions and the mold cavities. The various molding assembly components may be manually moved to their access positions or they may be driven via any known drive device (motors, engines, actuators, hydraulic or pneumatic cylinders, etc.) According to certain aspects, more than one molding assembly component may be moved from a molding configuration orientation to an operator accessing configuration or orientation by a single drive device or a single actuating action.

Additionally, some of the molding assembly components may be coupled to the drive devices or to other molding assembly components via articulated mechanisms. For example, a mold carrier may be configured to pivot or rotate relative to a pivoting mold carrier during movement from a molding position to an accessing position. These articulated mechanisms may allow relatively complex motions and displacements to be achieved. Further these articulated mechanisms may allow additional molding capability or capacity to be provided within a given working volume, as compared to non-articulated molding assemblies.

Given the general overview of various features and aspects of this invention, various specific embodiments of the invention will be described in more detail below with respect to FIGS. 1 to 18B.

Figure 2:
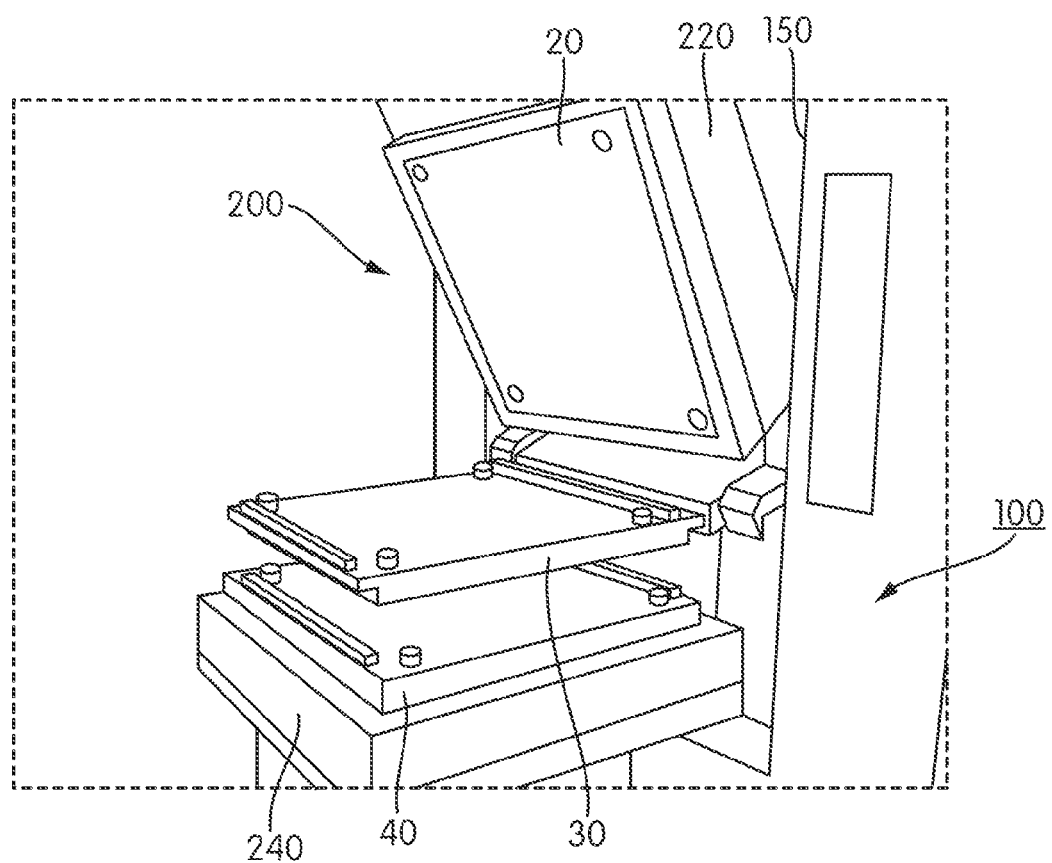
FIG. 2 is an angled side perspective view of the molding assembly of FIG. 1.

FIG. 1 is a front perspective view of a molding machine 100 with a molding assembly 200 in accordance with aspects of the invention. Specifically, the molding assembly 200 is shown in an open configuration with an upper mold portion 20, a middle mold portion 30 and a lower mold portion 40 located outside or at least partially outside of the working or platen volume 150. FIG. 2 is an angled side perspective view of the molding assembly 200 of FIG. 1.

According to some embodiments, molding assembly 200 may be used to form a sole, a portion of a sole, or other component for an article of footwear. In certain embodiments, a sole formed by molding assembly 200 may comprise the entire sole assembly, with a tread pattern being formed on the lower surface of the sole in molding assembly 200 to provide traction for the article of footwear. In other embodiments, molding assembly 200 may form portions of a sole or other portions of an article of footwear. As an example, mold cavities defined by one or more of the mold portions 20, 30, 40 may receive material to form a pair of soles, or portions thereof, for an article of footwear (whether poured, injected or otherwise inserted or introduced). In certain preferred embodiments, the soles or portions thereof, may be formed of ethylene vinyl acetate (EVA), polyurethane, for example, thermoplastic polyurethane (TPU), or rubber. In general, a molding machine and molding assembly as described herein may be used to manufacture any molded component or part from any material as would be apparent to persons of ordinary skill in the art, given the benefit of this disclosure.

The present invention may be embodied in various forms. One embodiment of a molding machine 100 used for forming a molded part is shown schematically in FIGS. 3A-3B. A frame 110 provides a housing for an upper platen 120, a lower platen 140 and a platen drive unit 160. In this particular embodiment, the lower platen 140 is connected to the drive unit 160 for movement up and down in a vertical direction and the upper platen 120 is fixedly attached to the frame 110. As used herein, the phrase "fixed structure" includes the fixed upper platen 120 and/or the frame 100. In general the "fixed structure" provides a stable, grounded, base to which other elements may be anchored.

The molding assembly 200 is located between the platens 120, 140. An upper mold carrier 220 is located adjacent to upper platen 120 and a lower mold carrier 240 is located adjacent to lower platen 140. Further, a middle mold carrier 230 may be located between the upper mold carrier 220 and the lower mold carrier 240. The middle mold carrier 230 may be attached, directly or indirectly, to the upper mold carrier 220.

The molding assembly 200 as illustrated in FIGS. 3A and 3B further includes an upper mold portion 20, a center or middle mold portion 30 and a lower mold portion 40. Upper mold portion 20 is carried by upper mold carrier 220. Middle mold portion 30 is carried by middle mold carrier 230. Lower mold portion 40 is carried by lower mold carrier 240. Mold portions 20, 30, 40 may be removably coupled to their respective mold carriers 220, 230, 240 so that the mold portions 20, 30, 40 may be replaced and/or removed.

The mold portions may define at least a portion of a mold cavity. As used herein, the phrase "mold cavity" refers to the enclosed volume that shapes the molded part. Such mold cavities are generally formed between two or more mold pieces or mold plates that open or separate to allow access to the interior of the mold cavity and that close to allow the molded part to be shaped to the enclosed volume of the mold cavity. Thus, each of the mold portions and/or mold plates defines one or more "mold cavity surfaces." As used herein, the phrase "mold cavity surface" may refer to a flat surface provided on a mold portion or mold plate, a recessed surface provided on a mold portion or mold plate, and/or a projecting surface provided on a mold portion or mold plate if such surface forms part of the volume that shapes the molded part.

According to some embodiments, upper mold portion 20 may include a primary mold plate 22 and an optional auxiliary mold plate 23, such that upper mold portion 20, by itself, may define one or more mold cavities or mold cavity surfaces 25 (see e.g., FIG. 8A). Similarly, middle mold portion 30 may also include a primary mold plate 32 and an optional auxiliary mold plate 33, such that middle mold portion 30 may define, by itself, one or more mold cavities or mold cavity surfaces 35 (see e.g., FIG. 18B), and lower mold portion 40 may include a primary mold plate 42 and an optional auxiliary mold plate 43, such that lower mold portion 40 may define one or more mold cavities or mold cavity surfaces 45 (see e.g., FIG. 18B). In other words, auxiliary mold plate 23 and primary mold plate 22 of upper mold portion 20 may engage with one another and cooperate to define one or more mold cavities when upper platen 120 and lower platen 140 apply pressure to the molding assembly 200. Similarly, auxiliary mold plates 33, 43 and primary mold plates 32, 42, respectively of middle and lower mold portions 30, 40 may engage with one another and cooperate to define one or more mold cavities when the upper and lower platens 120, 140 apply pressure to the molding assembly 200. If desired, auxiliary mold plates 23, 33, 43 may be latched or otherwise releasably attached to their respective primary mold plates 22, 32, 42 to maintain their cooperative engagement with one another during the molding process and/or during articulated movement of the molding portions.

According to even other embodiments, each mold portion 20, 30, 40 may cooperate with an adjacent mold portion to define mold cavities therebetween. As such, the optional auxiliary mold plates 23, 33 and 43 may be dispensed with. Thus, upper mold portion 20 and middle mold portion 30 may define one or more mold cavities therebetween (e.g., upper/middle mold cavities); while middle mold portion 30 and lower mold portion 40 may define one or more mold cavities therebetween (e.g., middle/lower mold cavities). In other words, upper mold portion 20 and middle mold portion 30 may engage with one another and cooperate to define one or more upper/middle mold cavities when upper platen 120 and lower platen 140 apply pressure to the molding assembly 200. Similarly, middle mold portion 30 and lower mold portion 40 may engage with one another and cooperate to define one or more middle/lower mold cavities therebetween when upper platen 120 and lower platen 140 apply pressure to the molding assembly 200. As one example, the mold cavities between the upper mold portion 20 and the middle mold portion 30 may be filled or partially filled with material to form a first left and right sole for an article of footwear, and the mold cavities between the middle mold portion 30 and the lower mold portion 40 may be filled or partially filled with material to form a second, independent left and right sole.

Figures 4A, 4B:
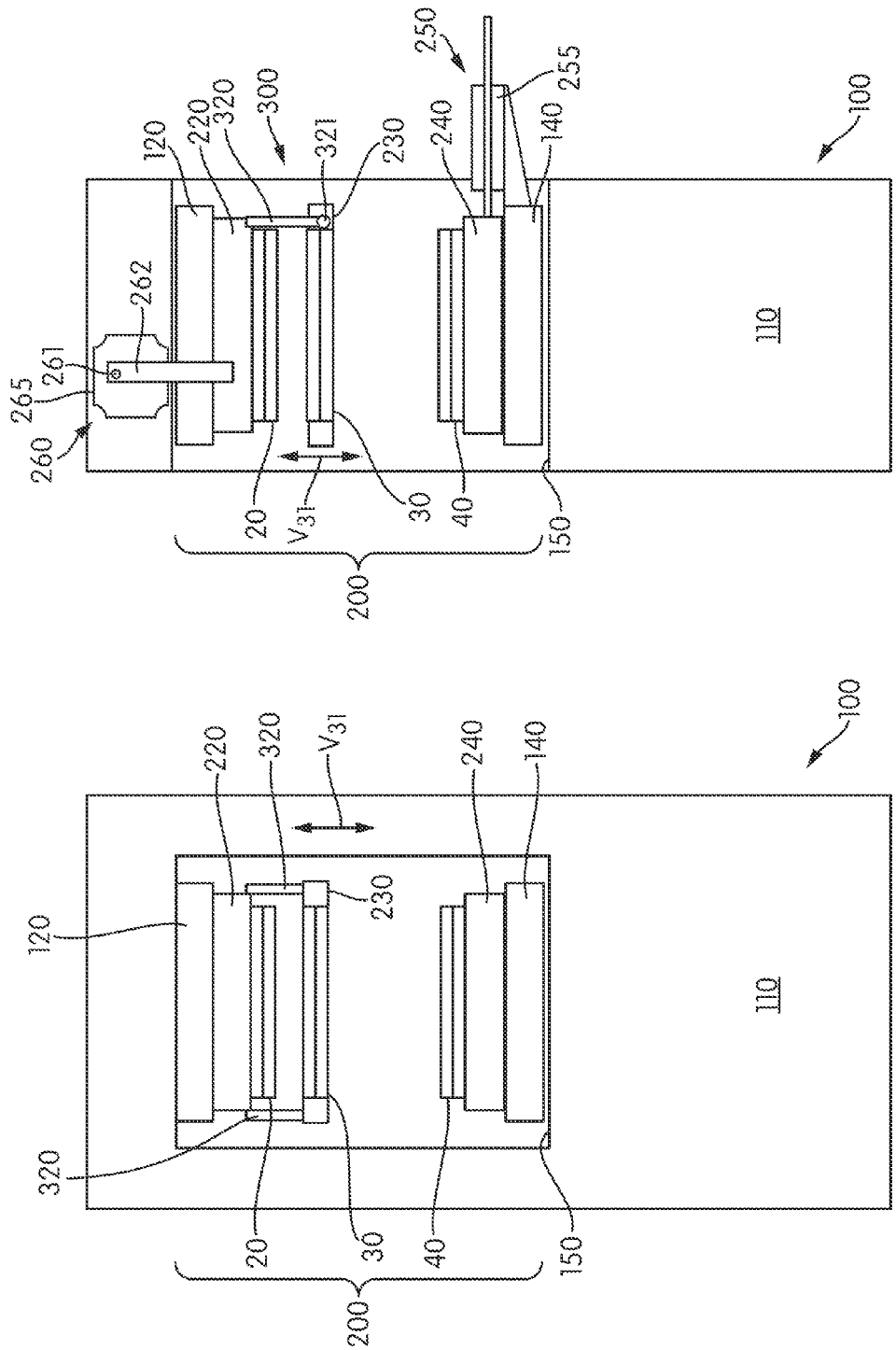
FIG. 4A is a schematic front view of the molding machine of FIGS. 3A and 3B in a partially open-mold configuration.
FIG. 4B is a schematic side view of the molding machine of FIG. 4A.

In operation, as shown in FIGS. 3A and 4A, the upper and lower platens 120, 140 may move toward and away from one another, thereby opening and closing the working or platen volume. FIG. 3A shows the platens 120, 140 and the molding assembly 200 in a substantially closed configuration. Although, in FIG. 3A "gaps" are shown between the molding portions 20, 30 and 40, these gaps are only for ease of visualizing the various individual components in the figure. In actuality, when the molding assembly 200 is fully closed, there would be no gaps between the various components transmitting the pressures applied by the platen drive unit 160 to the molding assembly 200. FIG. 4A shows the platen 120, 140 in a substantially fully open configuration.

Comparing FIGS. 3A and 3B to FIGS. 4A and 4B illustrates that middle mold portion 30 and/or middle mold carrier 230 is movably positionable between upper mold portion 20 and lower mold portion 40. Referring for example to FIG. 3B, middle mold portion 30 is shown pressed up against (or substantially up against) upper mold portion 20. Referring now to FIG. 4B, middle mold portion 30 and middle mold carrier 230 are shown moved vertically downward away (i.e., vertically displaced) from upper mold portion 20 and away from upper mold carrier 220.

Middle mold carrier 230 is coupled to upper mold carrier 220 by an articulation mechanism 300. The articulation mechanism 300 may be provided to guide, stabilize and/or align middle mold portion 30 and middle mold carrier 230 relative to upper mold portion 20 and relative to upper mold carrier 220 during relative motion. Thus, the articulation mechanism 300 may provide means for middle mold carrier 230 to move translationally and/or rotationally relative to upper mold carrier 220. Further, the articulation mechanism 300 may provide means for the middle mold carrier 230 to move translationally and/or rotationally relative to the upper platen 120 or to the frame 110.

In the particular embodiment of FIGS. 3-8, the articulation mechanism 300 includes a pair of connecting members 320 extending between upper mold carrier 220 and middle mold carrier 230. Connecting members 320 may be rigidly fixed to upper mold carrier 220. As used herein, a "rigidly fixed" joint is considered be both translationally fixed and rotationally fixed. "Translationally fixed" means that the attachment or joint does not allow relative translational movement, but may allow relative rotational movement. "Rotationally fixed" means that the attachment or joint does not allow relative rotational movement, but may allow relative translational movement. Middle mold carrier 230 may be coupled to connecting members 320 such that middle mold carrier 230 may be translationally displaced with respect to upper mold carrier 220. As one example, middle mold carrier 230 may be slidably coupled to connecting members 320 such that middle mold carrier 230 may linearly move apart from upper mold carrier 220 (e.g., vertically as shown in FIG. 4B).

Other attachment configurations of the connecting members 320 to the upper and middle mold carriers 220, 230 may allow the middle mold carrier 230 to move vertically relative to the upper mold carrier 220. For example, middle mold carrier 230 may be translationally fixed to connecting members 320 and upper mold carrier 220 may be slidably coupled to connecting member 320. As another alternative, both upper and middle mold carriers 220, 230 may be translationally fixed to connecting members 320 and each connecting member 320, itself, may lengthen or shorten.

By way of non-limiting example, a connecting member 320 may include a pin and slot arrangement that accommodates relative vertical ($V_{31}$) motion between upper mold carrier 220 and middle mold carrier 230 (and thus also relative vertical motion between upper mold portion 20 and middle mold portion 30). As another example, a connecting member 320 may include a piston/cylinder arrangement. As even another example, a connecting member 320 may include a scissor-type extendable/retractable mechanism. Other means for achieving relative vertical motion between the upper and middle mold carriers 220, 230 would be apparent to persons of ordinary skill in the art given the benefit of this disclosure.

Gravity may be used to drive the relative motion. Specifically, when lower platen 140 is driven downward (away from upper platen 120), lower mold carrier 240 may move away from upper mold carrier 220, such that middle mold portion 30 is no longer pressed tightly between the upper mold portion 20 and the lower mold portion 40. As lower platen 140 continues to move away from upper platen 120, middle mold portion 30 will rest on lower mold portion 40 and follow lower platen 140 downward. As lower platen 140 continues to move even further away from upper platen 120, middle mold carrier 230 and middle mold portion 30 will reach the lower end of guide member and be unable to travel any further downward. At this point, middle mold portion 30 and lower mold portion 40 will separate from one another as lower platen 140 continues to move downward.

According to certain aspects and as best shown by comparing FIGS. 4A and 4B with FIGS. 5A and 5B, lower mold carrier 240 may be movably attached to lower platen 140. Specifically, referring for example to FIG. 5B, lower mold carrier 240 may slide horizontally relative to lower platen 140, such that the lower mold carrier 240 and the lower mold portion 40 attached thereto are at least partially positioned outside of the platen volume 150. For example, a displacement mechanism 250 may be provided between lower mold carrier 240 and lower platen 140 such that lower mold carrier 240 may slide horizontally ($H_{40}$) relative to the lower platen 140. As an example, the displacement mechanism 250 may include horizontal rails 252 and a drive unit 255 for moving the lower mold carrier 240 horizontally relative to the lower platen 140. In one example embodiment, drive unit 255 may be a pneumatic or a hydraulic cylinder.

When lower mold carrier 240 and lower mold portion 40 are located outside of (or at least partially outside of) the platen volume 150, a mold operator may safely and ergonomically access mold portion 40. For example, referring to FIG. 6B, a mold operator may safely remove the auxiliary plate 43 (if any) from the lower mold portion 40 and/or also remove the molded parts from the lower mold portion 40 and/or place material to-be-molded (i.e., a material charge) within the mold cavity. Auxiliary plate 43 also could be interchanged with a different auxiliary plate 43, if desired.

According to other aspects and as best shown by comparing FIGS. 6A and 6B with FIGS. 7A and 7B, upper mold carrier 220 may be movably attached to upper platen 120 or to frame 110. Specifically, referring for example to FIG. 7B, upper mold carrier 220 may tilt, rotate or pivot relative to upper platen 120 (and also relative to frame 110). In certain embodiments, angular displacement may be accompanied by horizontal and/or vertical movement such that the upper mold carrier 220 and the upper mold portion 20 attached thereto may be at least partially positioned outside of the platen volume 150. For example, a pivoting mechanism 260 may be provided between upper mold carrier 220 and frame 110 such that upper mold carrier 220 may be angularly pivoted and linearly displaced relative to frame 110 (and also relative to upper platen 120 in this illustrated example). As an example, the pivoting mechanism 260 may include pivot arm 262 and a drive unit 265 for displacing the upper mold carrier 220 relative to the frame 110 and relative to the upper platen 120. In one example embodiment, drive unit 265 may be an electric motor. As shown in FIG. 7B, pivot arm 262 may be driven through an angle (A) around axis 261. Axis 261 is associated with the frame 110 (i.e., axis 261 is fixed to the frame). The action of pivoting causes upper mold portion 20 and upper mold carrier 220 to rotate through the same angle (A) and also to be displaced horizontally ($H_{20}$) and vertically ($V_{20}$).

Still referring to FIG. 7B, middle mold carrier 230 and middle mold portion 30 are coupled to upper mold carrier 220 and travel with upper mold carrier 220 when it pivots around axis 261. Middle mold carrier 230 and middle mold portion 30 are also shown moving horizontally ($H_{30}$) and vertically ($V_{32}$) relative to upper platen 120 via the pivoting action of pivoting mechanism 260 around axis 261. The total vertical displacement ($V_{30}$) of middle mold portion 30 from its fully closed configuration (see FIG. 3B) to its fully open configuration (see FIG. 7B) is the sum of the vertical displacements $V_{31}$ (see FIG. 4B) and $V_{32}$ (see FIG. 7B).

In addition, middle mold carrier 230 and middle mold portion 30 are also shown moving angularly with respect to upper mold carrier 220 and upper mold portion 20 (or vice versa, upper mold carrier 220 and upper mold portion 20 are shown angularly displacing with respect to middle mold portion 30). In other words, whereas upper mold portion 20 and middle mold portion 30 are generally oriented parallel to one another in FIG. 6B, in FIG. 7B they are no longer parallel to one another. Thus, according to certain embodiments, middle mold portion 30 may remain horizontal or substantially horizontal, as shown in FIG. 7B. Alternatively (not shown), middle mold portion 30 may also move angularly with respect to upper and lower platens 120, 140 (and also with respect to frame 110).

According to some embodiments, the articulated mechanism 300 provides for relative rotation or angular displacement of middle mold carrier to 230 to upper mold carrier 220. For example, a perimeter edge of the middle mold carrier 230 may be rotationally coupled to the connecting members 320 such that middle mold carrier 230 may be angularly displaced around an axis 321 with respect to upper mold carrier 220. As one example, the edge of middle mold carrier 230 may be hingedly coupled at axis 321 to a lower end of each connecting member 320. As can be seen, upper mold carrier 220 may rotate or pivot clockwise around axis 261, while middle mold carrier 230 may rotate counterclockwise around axis 321.

Axis 321 is associated with the pivot member or arm 262, in that axis 321 moves with pivot member or arm 262. In other words, axis 321 is associated with pivot member 262 because it travels with pivot member 262, even if axis 321 does not extend through pivot member 262 or even if axis 321 may additionally displace relative to pivot member 262. Thus, when pivot member 262 angularly displaces around axis 261, upper mold carrier 220, connecting members 320 and axis 321 also angularly displace around axis 261. Additionally, middle mold carrier 230 also travels with pivot member 262 and angularly displaces around axis 261.

As another example, a locking or latching mechanism (not shown) may be located on a connecting member 320, for example near the rotational axis 321 (see FIG. 7B). This locking or latching mechanism may initially maintain the horizontal plane of middle mold carrier 230 perpendicular to the connecting members 320 as middle mold carrier 230 moves vertically within the platen volume 150 (see FIG. 4B). The locking or latching mechanism may be released or activated during or after drive unit 265 pivots the upper mold carrier 220 to its fully open configuration (see FIG. 7B). With the locking mechanism released, the middle mold carrier 230 may then rotate a predetermined amount relative to the connecting members 320. For example, as shown in the embodiment of FIG. 7B, the middle mold carrier 230 may be rotated through an angle necessary to maintain it parallel (or substantially parallel) to the lower platen 140. A stop or other limiter (not shown) may be provided with the locking or latching mechanism to limit the amount of rotation (e.g. so as not to allow the free end of the middle mold carrier 230 to drop lower than a predetermined level (e.g., below a horizontal plane)).

With upper mold carrier 220 and upper mold portion 20 located outside of (or at least partially outside of) the platen volume 150, a mold operator may safely and ergonomically access upper mold portion 20. For example, referring to FIG. 8B, a mold operator may safely remove the auxiliary plate 23 (if any) from the upper mold portion 20 and also remove the molded parts from the upper mold portion 40 and/or place material to-be-molded within the mold cavity. Similarly, with middle mold carrier 230 and middle mold portion 30 located outside of (or at least partially outside of) the platen volume 150, a mold operator may safely and ergonomically access middle mold portion 30. For example, referring to FIG. 8B, a mold operator may safely remove the auxiliary plate 33 (if any) from the middle mold portion 30 and also remove the molded parts from the middle mold portion 30 and/or place material to-be-molded within the mold cavity without having to reach inside the working or platen volume 150 of the mold assembly 100.

The steps shown in FIGS. 3-8 for opening the molding assembly 200 may be reversed in order to close the molding assembly 200. In certain embodiments, the steps need not be conducted in the order presented above. For example, the lower mold carrier 240 may be displaced horizontally into its open or closed position before the upper mold carrier 220 is pivoted. In other embodiments, certain steps may be eliminated. As an example, the lower mold carrier 240 need not be displaced horizontally at all.

Figure 9:
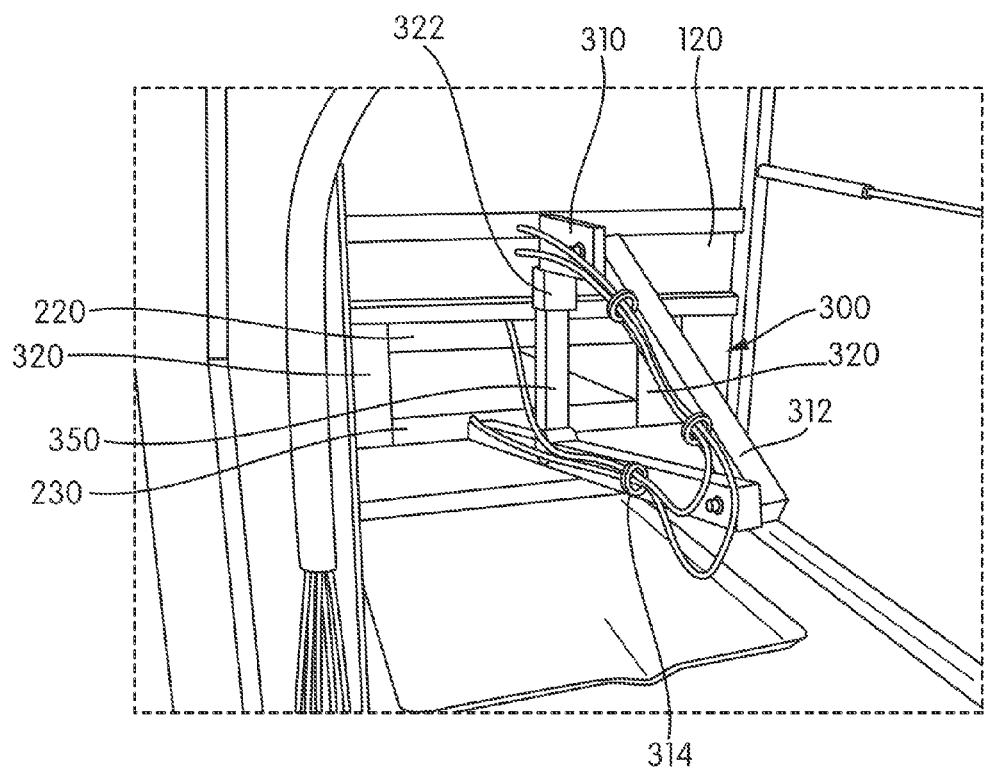
FIG. 9 is a rear perspective view of a molding assembly in accordance with an embodiment of the invention.

FIG. 9 shows another possible articulated mechanism 300 for coupling middle mold carrier 230 to upper mold carrier 220 and for guiding the movement of middle mold carrier 230 relative to upper mold carrier 220 and relative to upper platen 120 and/or frame 110. Specifically, in this particular embodiment, articulated mechanism 300 includes a plurality of linkage members 312, 314 coupling middle mold carrier 230 to platen 120 (or optionally to frame 110). Each linkage member has a first end and an opposed second end. A pair of connecting members 320 couple middle mold carrier 230 to upper mold carrier 220. FIG. 9 also illustrates a pneumatic cylinder or venting device 350 used to vent gases or trapped air from the middle mold 30 during the molding operation. Additionally, a bumper element 322, which in the example embodiment is shown as a compression spring, is provided in this embodiment. Bumper element 322 prevents portions of molding assembly 200 from damaging or jarring other portions as the components of molding assembly 200 come into contact with one another.

Referring to FIG. 10, a molding machine 100 is shown having a frame 110, upper platen 120, lower platen 140 and platen drive 160 as described above with respect to the embodiment of FIGS. 3A and 3B. A molding assembly 200 is located between the platens 120, 140. The molding assembly 200 includes an upper mold carrier 220 located adjacent to the upper platen 120 and a lower mold carrier 240 positioned adjacent to the lower platen 140. Further, the molding assembly 200 includes a middle mold carrier 230. Upper, middle and lower mold portions 20, 30, 40 are carried, respectively, by upper, middle and lower mold carriers 220, 230, 240. In this particular embodiment, mold portions 20, 30, 40 are illustrated as each having a single mold plate, e.g., primary mold plates 22, 32, 42, although each mold portion may be composed of a plurality of mold plates.

Still referring to FIG. 10, an embodiment of an articulated mechanism 300 is schematically illustrated. A standoff or arm 310 is rigidly fixed to upper platen 120. Alternatively, rather than being coupled to upper platen 120, arm 310 of articulated mechanism 300 may be coupled to frame 110. A first end of a first linkage member 312 is rotatably coupled to arm 310. This may be accomplished via a lug-and-clevis type pinned joint or other pinned or hinge-type joints as would be known to persons of ordinary skill in the art. A first end of second linkage member 314 is rotatably coupled to the second end of the first linkage member 312. The second end of the second linkage member 314 is coupled to the middle mold carrier 230 and also to the lower ends of the connecting members 320 (via, for example, a horizontal axle). In this particular embodiment, the second end of the second linkage member 314 is rigidly fixed to middle mold carrier 230 and rotationally coupled at axis 321 to the connecting members 320. The lengths and relative lengths of first and second linkage members 312, 314 may be selected to accommodate the stroke length or the amount of working volume and the desired displacement of the middle mold carrier 230.

The connecting members 320 extend between the upper mold carrier 220 and the middle mold carrier 230. The upper ends of connecting members 320 are rigidly fixed to upper mold carrier 220. The lower ends of connecting members 320 are rotatably coupled around axis 321 to middle mold carrier 230 and also to the second end of the second linkage member 314. Further, connecting members 320 allow the middle mold carrier 230 to translationally move toward and away from the upper mold carrier 220.

Figure 12:
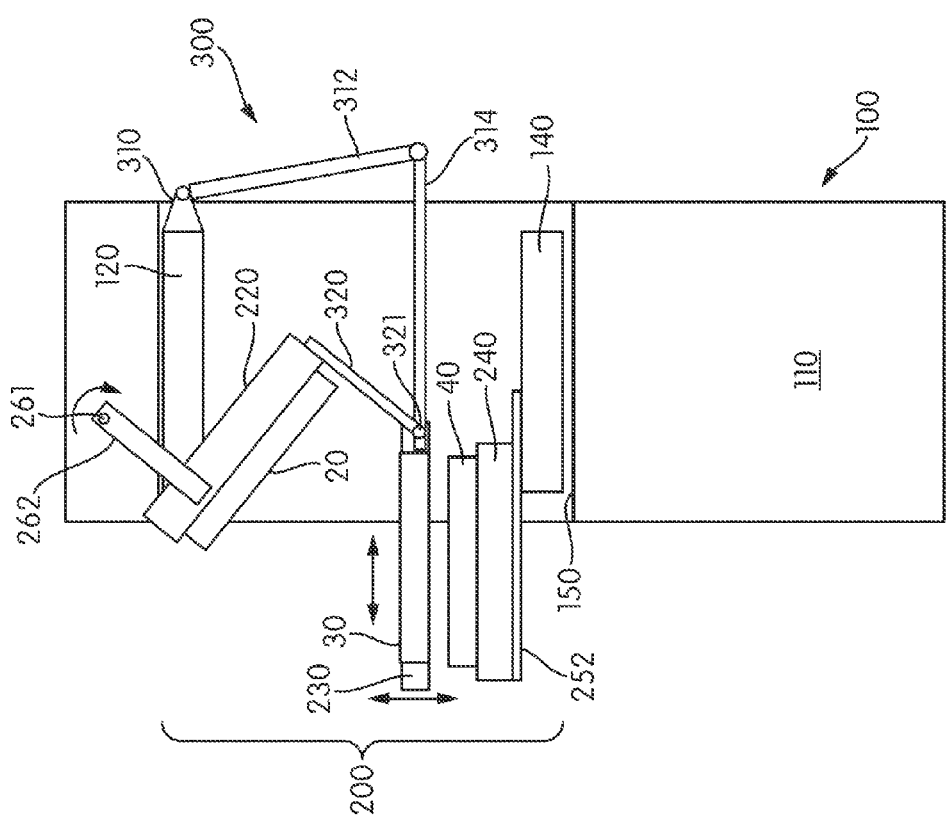
FIG. 12 is a schematic side view of the molding machine of FIG. 11 in a fully open-mold configuration with a lower mold carrier, an upper mold carrier, and a middle mold carrier located at least partially outside of the platen volume.

Referring to FIGS. 10, 11 and 12, the operation of articulated mechanism 300 as the molding assembly 200 goes from a closed position (see FIG. 10) to an open position (see FIG. 12) is schematically illustrated. In FIG. 10, the molding assembly 200 is in its closed configuration with lower platen 140 driven upward toward upper platen 120 so as to drive mold portion 40 against mold portion 30 and mold portion 30 against mold portion 20. (As noted above with respect to FIG. 3A, the "gaps" shown between the molding portions 20, 30 and 40 in FIG. 10 are only for ease of visualizing the various individual components in the figure.)

In FIG. 11, the lower platen 140 has moved to its lowermost position, and in moving downward has allowed the middle mold carrier 230 (with middle mold portion 30) to displace vertically away from upper mold carrier 220 and upper mold portion 20. The linkage members 312, 314 of the articulated mechanism 300 maintain the middle mold carrier 230 in a stable, approximately parallel, orientation to the upper mold carrier 220. Further, in FIG. 11, the lower mold carrier 240 and lower mold portion 40 have been horizontally displaced from between the platens 120, 140. The translational movement of the lower mold carrier 240 may be driven (for example, as described above with respect to FIGS. 5A and 5B) or may optionally be manually moved by the mold operator.

In FIG. 12, the upper mold carrier 220 is pivotally displaced around pivot axis 261. The rotational movement of the upper mold carrier 220 may be driven (for example, as described above with respect to FIGS. 7A and 7B) or may optionally be manually moved by the mold operator. As the upper mold carrier 220 pivots, connecting members 320 also pivot and displace vertically and horizontally. In particular, linkage members 312, 314 also swing down, thereby controlling, in conjunction with connecting members 320 and the pivoting of the upper mold carrier 220, the displacement and orientation of middle mold carrier 230. In this embodiment, the middle mold carrier 230 is maintained approximately parallel to the upper and lower platens 120, 140 as it is moved out from between the platens. Persons of skill in the art understand that the individual components of the articulated mechanism may be sized to provide the desired final placement and orientation of the middle mold carrier 230. The steps shown in FIGS. 10-12 for opening the molding assembly 200 may be reversed in order to close the molding assembly 200.

An alternative embodiment is schematically illustrated in FIGS. 13-17. Referring to FIGS. 13A and 13B, a molding machine 100 is shown having a frame 110, upper platen 120, lower platen 140 and platen drive 160 as described above with respect to the embodiment of FIGS. 3A and 3B. A molding assembly 200 is located between the platens 120, 140. The molding assembly 200 includes an upper mold carrier 220 located adjacent to the upper platen 120 and a lower mold carrier 240 positioned adjacent to the lower platen 140. Further, the molding assembly 200 includes a middle mold carrier 230. Upper, middle and lower mold portions 20, 30, 40 are carried, respectively, by upper, middle and lower mold carriers 220, 230, 240. In the closed position (not shown), the upper, middle, and lower mold portions 20, 30, 40 abut one another. Rather, in FIGS. 13A and 13B, the lower platen 140 is shown moved downward from its fully closed position such that the lower and middle mold carriers 240, 230 have been vertically displaced downward from their closed positions. As such, upper mold portion 20 is no long abutting or in contact with middle mold portion 30. However, middle mold portion 30 is still in contact with (and resting on) lower mold portion 40.

Figure 13A:
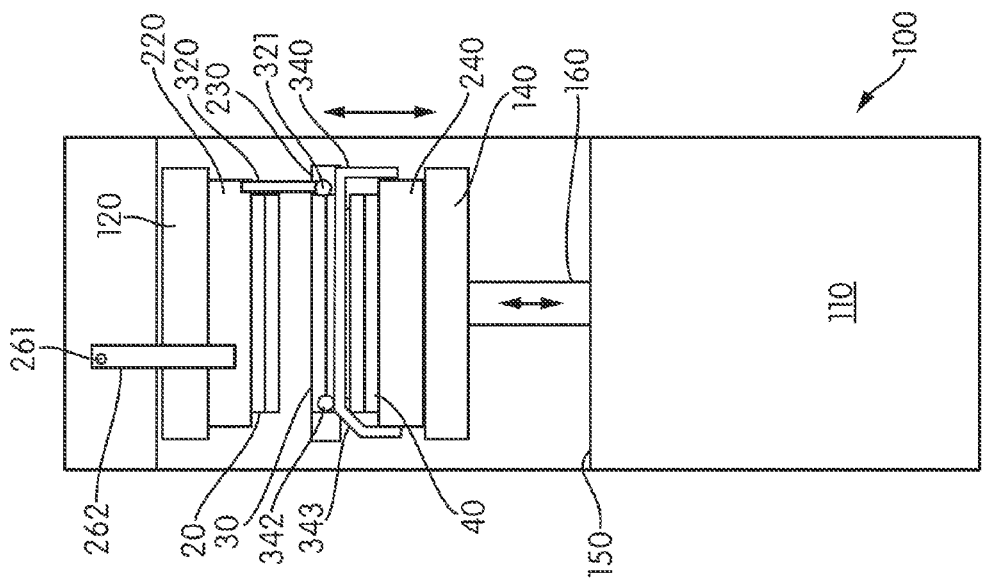
FIG. 13A is a schematic front view of a molding machine in a first mold opening configuration according to another embodiment of the invention.
Figure 13B:
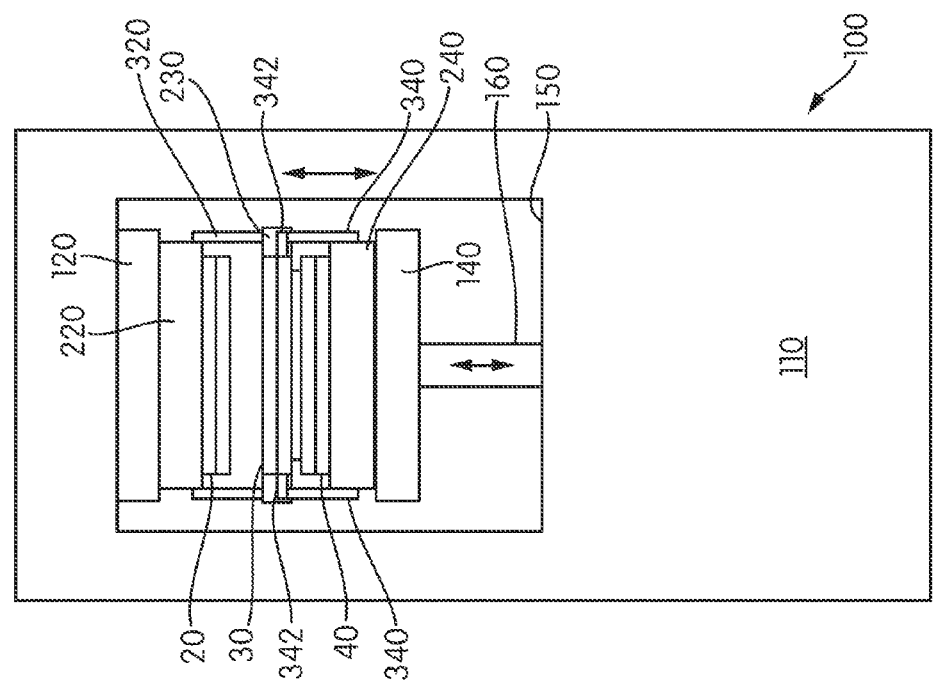
FIG. 13B is a schematic side view of the molding machine of FIG. 13A.

Still referring to FIGS. 13A and 13B, another embodiment of an articulated mechanism 300 is schematically illustrated. As with the previous embodiments, at least one connecting member 320 extends between the upper mold carrier 220 and the middle mold carrier 230. The upper end of each connecting member 320 is rigidly fixed to upper mold carrier 220. The lower end of each connecting member 320 is rotatably coupled around axis 321 to middle mold carrier 230. Further, the connecting members 320 guide the middle mold carrier 230 as it moves vertically downward (and upward) relative to the upper mold carrier 220. In this embodiment, as an example, each connecting member 320 may include a track and slider arrangement with a hinged connection between the connecting member 320 and the middle mold carrier 230.

In this embodiment, an adjunct to the articulated mechanism 300 is provided. Support member 340 may assist in the support, positioning and/or displacement guidance of the middle mold carrier 230. As an example, support member 340 may include a sliding surface provided by a rail, track, runner or other displacement guidance member. The support member 340 may be attached to lower mold carrier 240. As illustrated in FIGS. 13-17, the support member 340 may be oriented generally horizontally and may extend from front to back on either side (or both sides) of the lower mold carrier 240. A rolling element, sliding element, sliding surface or other guided element 342 may be complementarily provided on middle mold carrier 230. In this particular embodiment, first and second rollers or wheels 342 are provided adjacent the front corners of the middle mold carrier 230. Rollers 342 rest on and travel along the length of rails 340. Referring to FIGS. 13B, 14B, 15, 16 and 17B, a front portion of rail 340 may be provided with a recessed region 343 to allow roller 342 to drop down (relative to the main run 344 of rail 340) so that contact between the middle and lower mold portions 30, 40 is possible. In other words, recessed region 343 of rail 340 allows roller 342 to displace downward such that middle mold portion 30 may rest on and be pressed against lower mold portion 40 in the molding configuration. In this step of the sequence, middle mold portion 30 is oriented substantially parallel to both the upper and lower mold portions 20, 40 and to upper and lower platens 120, 140.

Figure 14B:
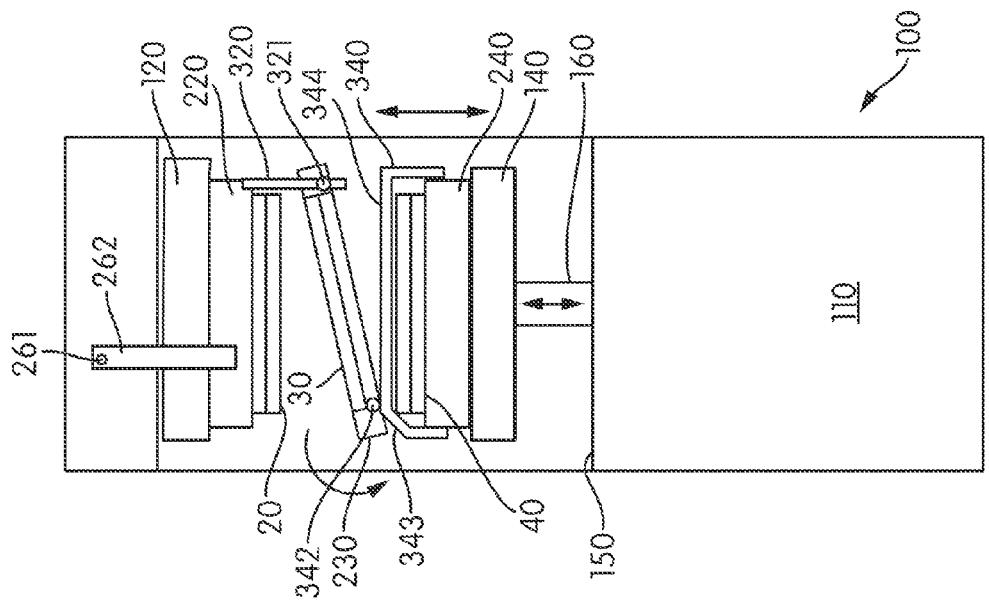
FIG. 14B is a schematic side view of the molding machine of FIG. 14A.
Figure 14A:
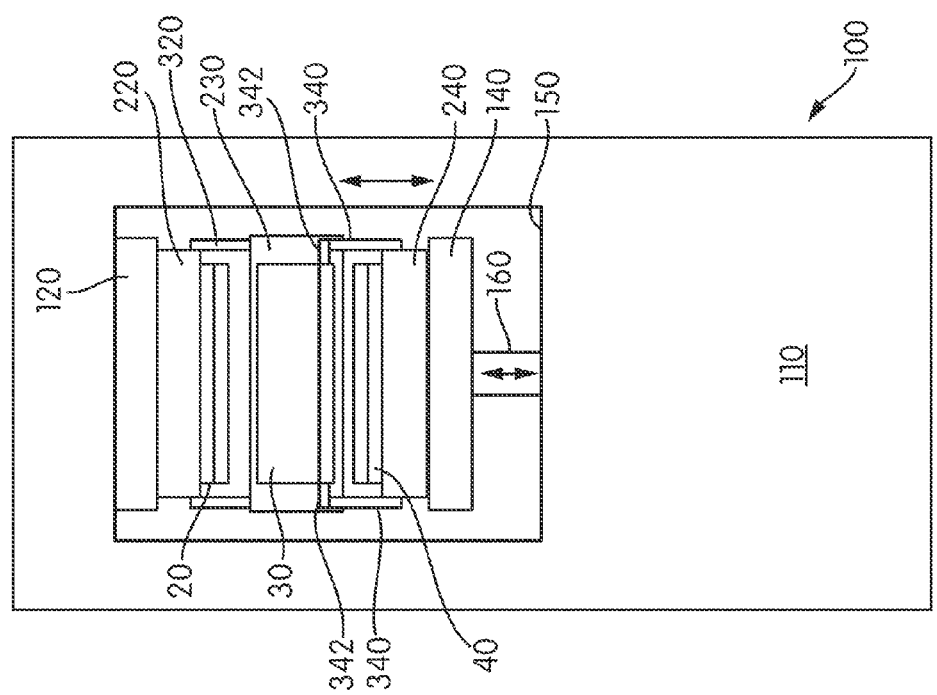
FIG. 14A is a schematic front view of the molding machine of FIGS. 13A and 13B in a second mold opening configuration.

Now referring to FIGS. 14A and 14B, the lower platen 140 has been moved even further downward such that middle mold portion 30 is no long abutting or in contact with lower mold portion 40. In this step of the sequence, middle mold carrier 230 and middle mold portion 30 are no longer oriented substantially parallel to both the upper and lower mold portions 20, 40. Rather, as lower platen 140 moves downward, middle mold carrier 230 and middle mold portion 30 rotate around axis 321. Roller 342 maintains contact with rail 340. However, roller 342 may now have exited the recessed region 343, such that roller 342 now rests on the main run 344 of rail 340. At this step of the sequence, middle mold carrier 230 and middle mold portion 30 are oriented at an angle to both the upper and lower mold portions 20, 40 and to upper and lower platens 120, 140.

Figure 15:
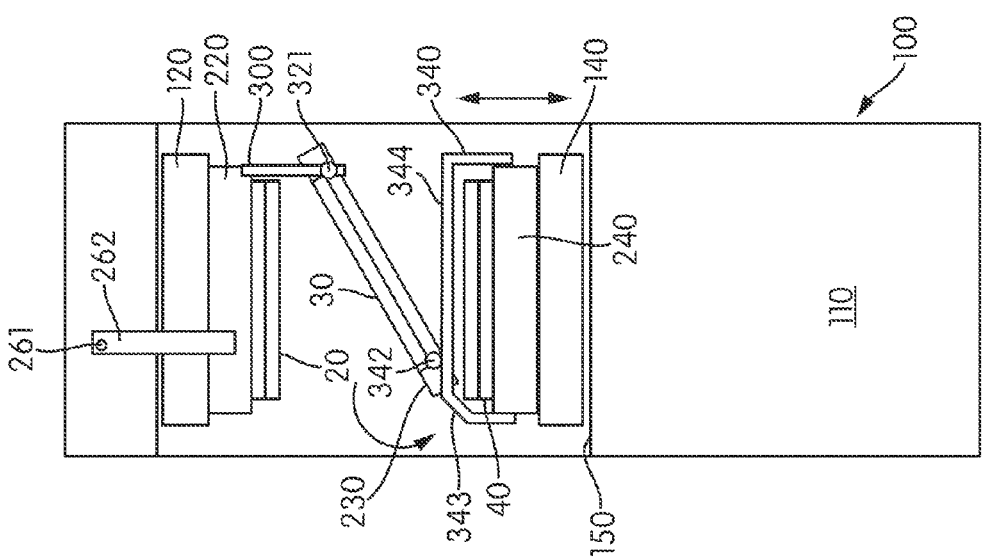
FIG. 15 is a schematic side view of the molding machine of FIGS. 13A and 13B in a third mold opening configuration.

In FIG. 15, lower platen 140 has been moved even further downward to its lowermost position, and in moving downward has allowed the middle mold carrier 230 (with middle mold portion 30) to rotate even more around axis 321. Roller 342 maintains contact with rail 340.

Figure 16:
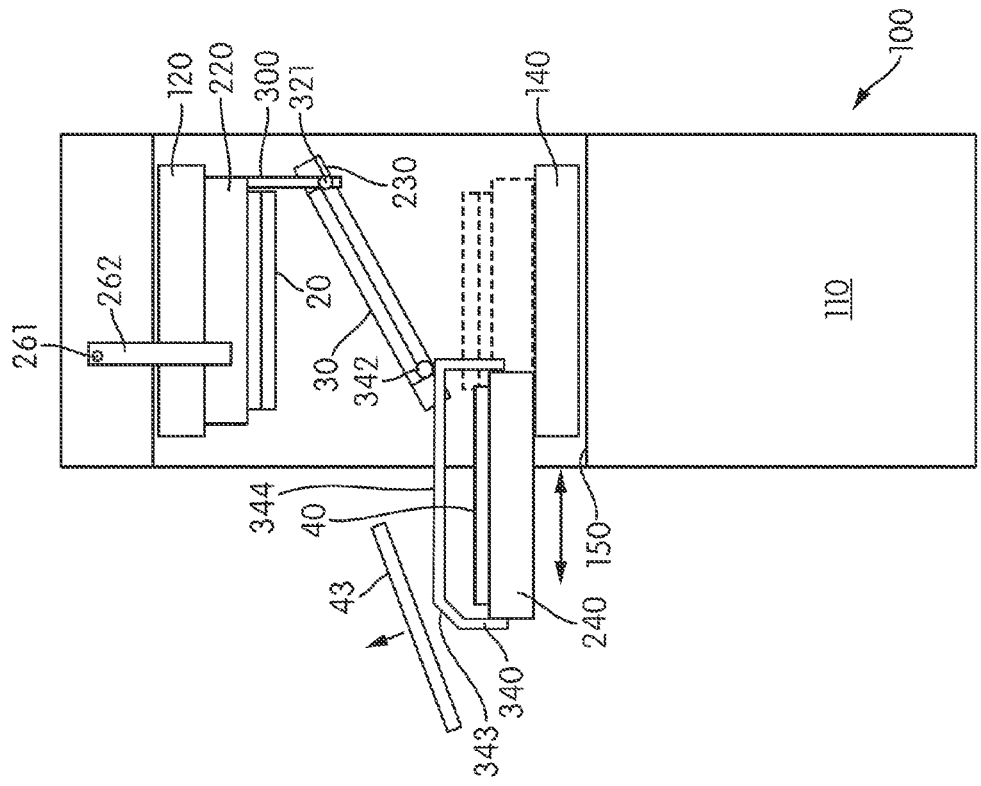
FIG. 16 is a schematic side view of the molding machine of FIGS. 13A and 13B in a partially open-mold configuration with a lower mold carrier located at least partially outside of the platen volume and with an optional auxiliary plate and/or a molded component being removed from the lower mold carrier.

Now referring to FIG. 16, the lower mold carrier 240 with the lower mold portion 40 is shown horizontally displaced toward the front of the molding machine 100 such that the lower mold portion 40 is at least partially located outside of the platen volume 150. When the lower mold carrier 240 slides forward, the roller 342 maintains contact (sliding or rolling) with the rail 340. The angular orientation of the middle mold carrier 230 may be maintained constant during this step of the sequence. At this step of the sequence, the mold operator may safely and ergonomically remove the auxiliary plate 43 (if any) from the lower mold portion 40 and empty and/or fill the mold cavities of the lower mold portion 40.

In FIGS. 17A and 17B, the upper mold carrier 220 is pivotally displaced around pivot axis 261. As the upper mold carrier 220 pivots, connecting members 320 also pivot and displace vertically and horizontally. In this embodiment, middle mold carrier 230 moves forward with the roller 342 maintaining contact and sliding (or rolling) along the rail 340. In addition, the middle mold carrier 230 rotates relative to connecting members 320 around axis 321. The angular orientation of the middle mold portion 30 may decrease or flatten (or become less steep) when compared to FIGS. 15 and 16 as the middle mold carrier 230 displaces forwardly. Thus it has been shown in FIG. 17B, that middle mold carrier 230 both pivots around axis 261 (in conjunction with the pivoting of the upper mold carrier 220 and pivoting mechanism 260) and also rotates around axis 321. In this embodiment, the angular displacement around axis 261 is clockwise, while the angular displacement around axis 321 is counterclockwise.

At this step of the sequence, the mold operator may safely and ergonomically remove the auxiliary plate 23, 33 (if any) from the upper and middle mold portions 20, 30 and empty and fill the mold cavities of the mold portions 20, 30. The steps shown in FIGS. 13-17 for opening the molding assembly 200 may be reversed, in order to close the molding assembly 200.

Figure 18B:
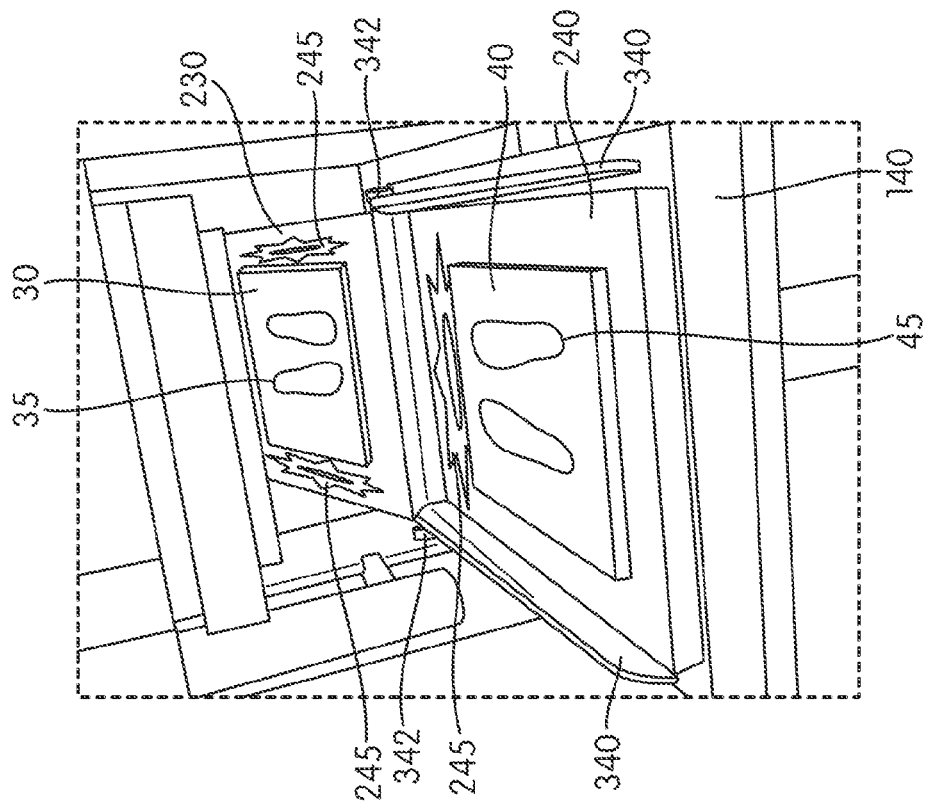
FIG. 18B is a front perspective view of the molding assembly of FIG. 18A wherein the lower mold carrier and the middle mold carrier as shown with their respective mold portions in place. Heater elements are schematically shown in these figures.
Figure 18A:
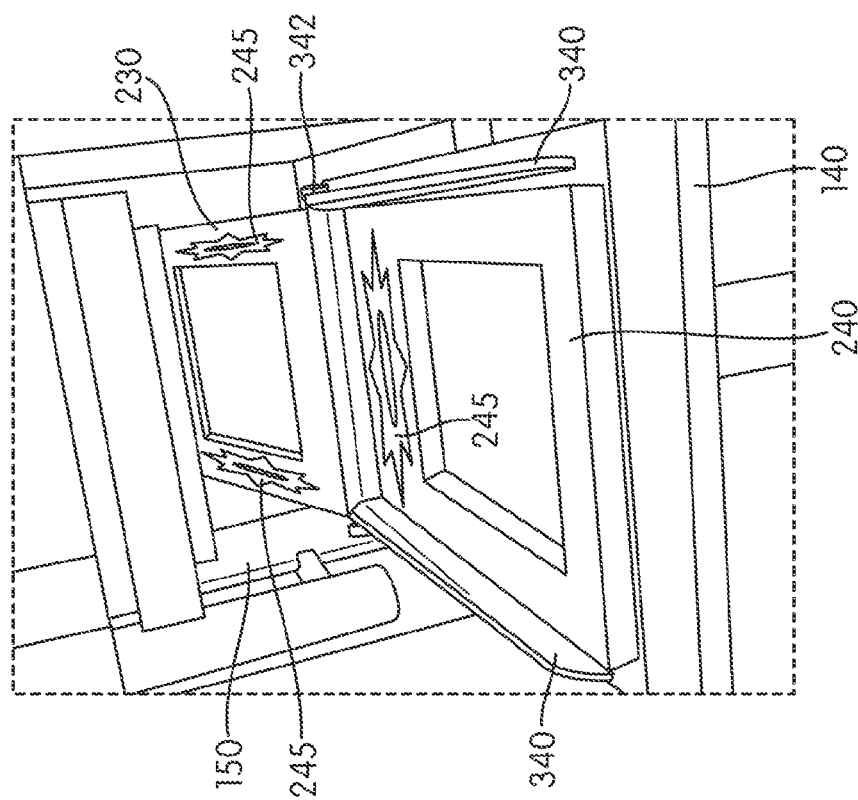
FIG. 18A is a front perspective view of a molding assembly according to an embodiment of the invention, showing a lower mold carrier (without mold portions) located at least partially outside of a platen volume and a middle mold carrier (without mold portions) located within the platen volume.

FIGS. 18A and 18B illustrate an example embodiment of a molding assembly 200 similar to that schematically illustrated in FIG. 16. In FIG. 18A, a lower mold carrier 240 is shown displaced forwardly such that it is positioned outside of the platen volume 150. A middle mold carrier 230 is shown located within the platen volume 150 and oriented at an angle to the lower mold carrier 240. Rollers 342 are located at the left and right forward corners of the middle mold carrier 230 and resting, respectively, on left and right rail 340. Middle mold carrier 230 is hingedly attached at its rearward edge to a connecting member (not shown).

For any of the embodiments described herein, mold carriers 220, 230, 240 may be formed as hollow frames, for example, hollow steel frames. Referring to FIG. 18A, a heating or cooling element (see item 245, schematically representing a heater element) may be provided on or within any one or more of the mold carriers 220, 230, 240. Particularly, one or more heating (or cooling) elements 245 may be provided on middle mold carrier 230. For example, heating elements 245 may be provided on opposite sides of the frame forming part of middle mold carrier 230. Optionally, a heating element 245 may extend all the way around (on or within) a mold carrier's framework. Referring to FIG. 18B, mold portions 20 (not shown), 30, 40 may be removable attached within the framework of the mold carriers 220 (not shown), 230, 240.

Molding machine 100 and molding assembly 200 may be used for alternative and/or additional molding operations. In certain aspects, the molding machine 100 and the molding assembly 200 may be used in a multi-stage molding process. For example, in a first stage of the molding process, a first portion of a molded part may be formed, and in a second stage of the molding process, a second portion of the molded part may be molded to the first portion of the molded part. Thus, the molding assembly 200 may be configured to provide molded parts having one or more layers, inserts, regions or other features formed with different materials (e.g., materials having different colors, different polymers, different densities, different cured characteristics, etc.).

As described in more detail below, the method for molding an article may include providing a middle mold portion defining a mold cavity surface. Specifically, the middle mold portion may include a primary middle mold plate and an auxiliary middle mold plate. The primary middle mold plate defines a middle mold cavity surface on its upper face. The auxiliary middle mold plate defines a middle mold cavity surface on its lower face. During the first stage of the molding process, the complementary alignment of the middle mold cavity surfaces of the primary middle mold plate and the auxiliary middle mold plate provide the middle mold portion with a middle mold cavity. The middle mold portion may be positioned within the working volume of the molding machine. Material introduced into the middle mold cavity is shaped to form a first molded article. The material within the middle mold cavity may be introduced via injection molding (for example, when the middle mold portion is positioned within the working volume) or as a compression molding material charge (for example, when the middle mold portion is in its access position at least partially outside the working volume).

The middle mold portion with the shaped first molded article is moved from its molding orientation within the working volume to its access orientation at least partially outside the working volume. The step of moving the middle mold portion may include pivoting the middle mold portion around a first axis associated with a fixed structure of the molding machine and rotating the middle mold portion around a second axis distinct from the first axis. The auxiliary middle mold plate is removed from the middle mold portion and the middle mold portion (minus the auxiliary middle mold plate, but retaining the first molded article) is moved from its access orientation back to its molding orientation.

An upper mold portion is positioned within the working volume. The upper mold portion includes a primary upper mold plate having an upper mold cavity surface on its lower face. During the second stage of the molding process, the upper mold cavity surface provided on the primary upper mold plate of the upper mold portion and the middle mold cavity surface provided on the primary middle mold plate of the middle mold portion are complementarily aligned and closed so as to form a second mold cavity or an upper-tomiddle mold cavity. Material introduced into the upper-to-middle mold cavity is shaped to form a second molded article. As with the material introduced into the mold cavity during the first stage, material introduce into the upper-to-middle mold cavity during the second stage may be introduced via injection molding or as a compression molding material charge. Because the first molded article was not removed from the middle mold cavity surface of the primary middle mold plate, this first molded article becomes incorporated into the second molded article during the second stage of the molding process.

During the first stage of the molding process, the method may further include providing a lower mold portion defining a lower mold cavity surface. Specifically, the lower mold portion may include a primary lower mold plate and an auxiliary lower mold plate. The primary lower mold plate defines a lower mold cavity surface on its upper face. The auxiliary lower mold plate defines a lower mold cavity surface on its lower face. During the first stage of the molding process, the complementary alignment of the lower mold cavity surfaces of the primary lower mold plate and the auxiliary lower mold plate provide the lower mold portion with a lower mold cavity. The lower mold portion may be positioned within the working volume of the molding machine and material introduced into the lower mold cavity is shaped to form a third molded article.

The lower mold portion with the shaped third molded article is moved from its molding orientation within the working volume to its access orientation at least partially outside the working volume. The step of moving the lower mold portion may include horizontally displacing the lower mold portion. The auxiliary lower mold plate is removed from the lower mold portion. Then, the primary lower mold plate of the lower mold portion, with the third molded article retained within its lower mold cavity surface, is moved from its access orientation back to its molding orientation.

As noted above, during the second stage of the molding process, the middle mold portion is also positioned within the working volume. The primary middle mold plate may not only include a mold cavity surface on its upper face as described above, but may also include a mold cavity surface on its lower face. During the second stage of the molding process, the mold cavity surface on the lower surface of the primary middle mold plate and the mold cavity surface on the upper surface of the primary lower mold plate are complementarily aligned and closed so as to form a third mold cavity or a middle-to-lower mold cavity. Material introduced into the middle-to-lower mold cavity is shaped to form a fourth molded article. Because the third molded article was not removed from the lower mold cavity surface of the primary lower mold plate, this third molded article becomes incorporated into the fourth molded article during the second stage of the molding process.

The upper mold portion, the middle mold portion and the lower mold portion may now all be moved from their molding position within the working volume to their access position. The second molded article may be removed from the open upper-to-middle mold cavity and the fourth molded article may be removed from the open middle-to-lower mold cavity. The second and fourth molded articles were formed in a two-stage molding process from two separately introduced materials. In certain preferred embodiments, the second and fourth molded articles may be identical and may from components for articles of footwear, particularly soles or portions of soles.

According to aspects of the invention and referring now to FIGS. 19-25, an articulated molding assembly 200 may be provided on a molding machine 100. This molding assembly 200 includes an upper mold carrier 220 and a middle mold carrier 230 and a lower mold carrier 240. These mold carriers may be, for example similar to that provided in the embodiment of FIGS. 3A and 3B. Further, this molding assembly 200 includes an upper mold portion 20, a middle mold portion 30 and a lower mold portion 40. In this particular embodiment, upper mold portion 20 may include a primary mold plate 22. Middle mold portion 30 may include a primary mold plate 32 and an auxiliary mold plate 33. Lower mold portion 40 may include a primary mold plate 42 and an auxiliary mold plate 43.

Figure 22:
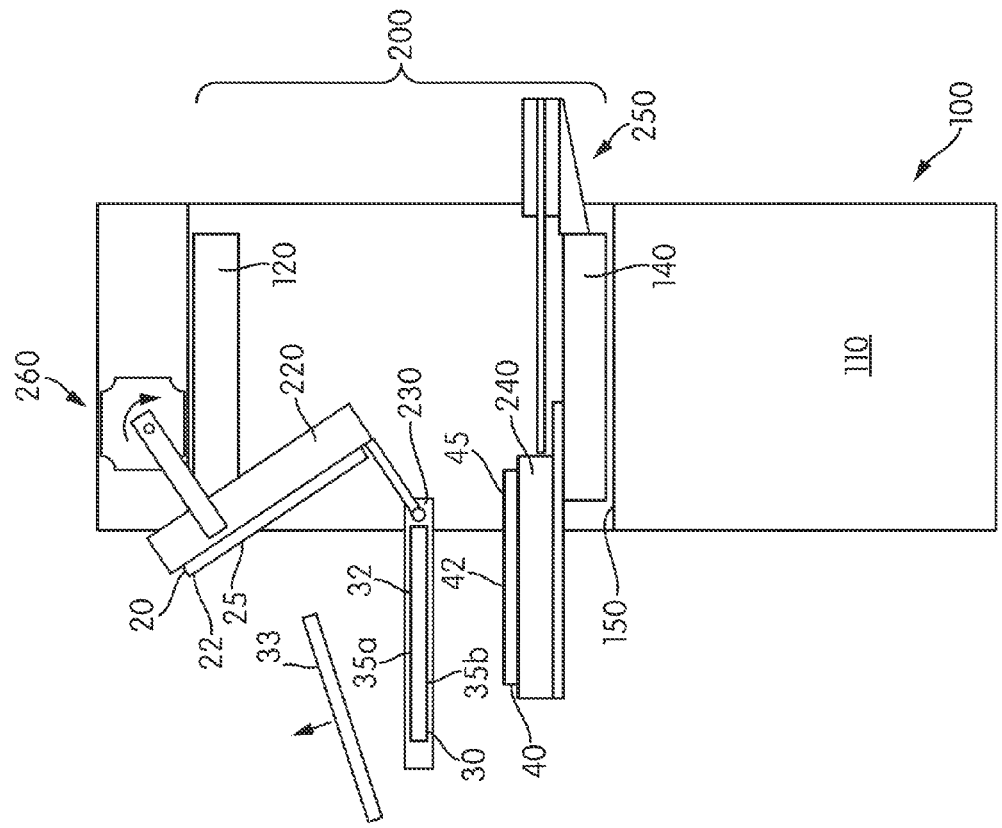
Figure 23B:
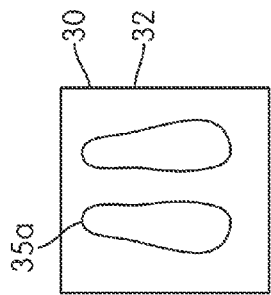
Figure 23C:
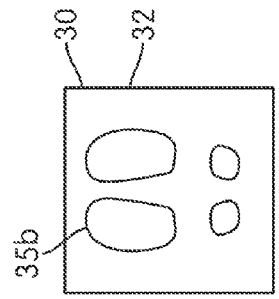
Figure 23D:
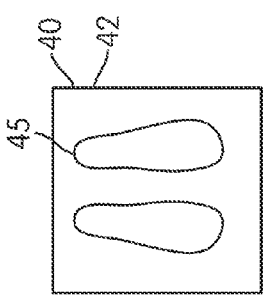
Figure 23A:
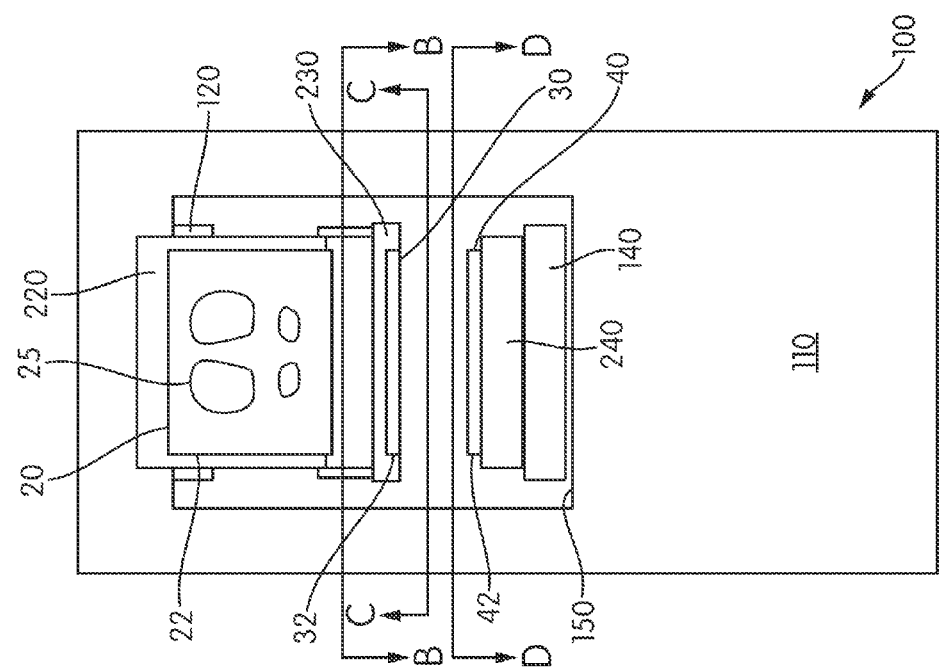

Referring now to FIGS. 23A-23D, primary mold plate 22 of upper mold portion 20 may include a mold cavity surface 25 located on its lower surface. As an example and as shown in FIG. 23A, mold cavity surface 25 may include recesses to form portions of a left and right sole for an article of footwear. Primary mold plate 32 of middle mold portion 30 may include a mold cavity surface 35a provided on its upper surface and a mold cavity surface 35b provided on its lower surface. Primary mold plate 42 of lower mold portion may include a mold cavity surface 45 provided on its upper surface. Auxiliary mold plates 33 and 43 (see e.g., FIGS. 20-22) may be provided as flat plates without recesses. Alternatively, auxiliary mold plates 33 and 43 may be formed with mold recesses (not shown) that complementarily align, at least partially, with the mold cavity surfaces 35a and 45 formed in the respective primary mold plates 32 and 42. As even another alternative, auxiliary mold plates 33 and 43 may be formed with positive, projecting mold portions (not shown) that complementarily align, at least partially, with the mold cavity surfaces 35a and 45 formed in the respective primary mold plates 32 and 42. As presented above, the phrase "mold cavity surface" refers to a surface that forms part of the volume that shapes the molded part, whether the surface is flat, recessed or projecting. Thus, auxiliary plates may include mold cavity surfaces.

Thus, advantageously, multiple identical sole portions may be formed during a single molding process. According to certain embodiments, mold cavity surface 45 formed on the upper surface of the mold plate 42 may be identical to mold cavity surface 35a formed on the upper surface of the mold plate 32. Further, mold cavity surface 25 formed on the lower surface of mold plate 22 may be identical to mold cavity surface 35b formed on the lower surface of mold plate 32 (the view of mold cavity surface 25 in FIG. 23A is slightly foreshortened as compared to the view of mold cavity surface 35b in FIG. 23C). Mold cavity surfaces 45 and 35a may form, for example, a first layer of left and right soles of an article of footwear. Mold cavity surfaces 25 and 35b may form, for example, a second layer for the forefoot and heel regions for the left and right soles of the article of footwear. According to this embodiment, the multi-stage molding process advantageously allows multiply identical sole portions, each having a plurality of layers and/or materials, to be formed during a single (multi-stage molding process).

Figure 19:
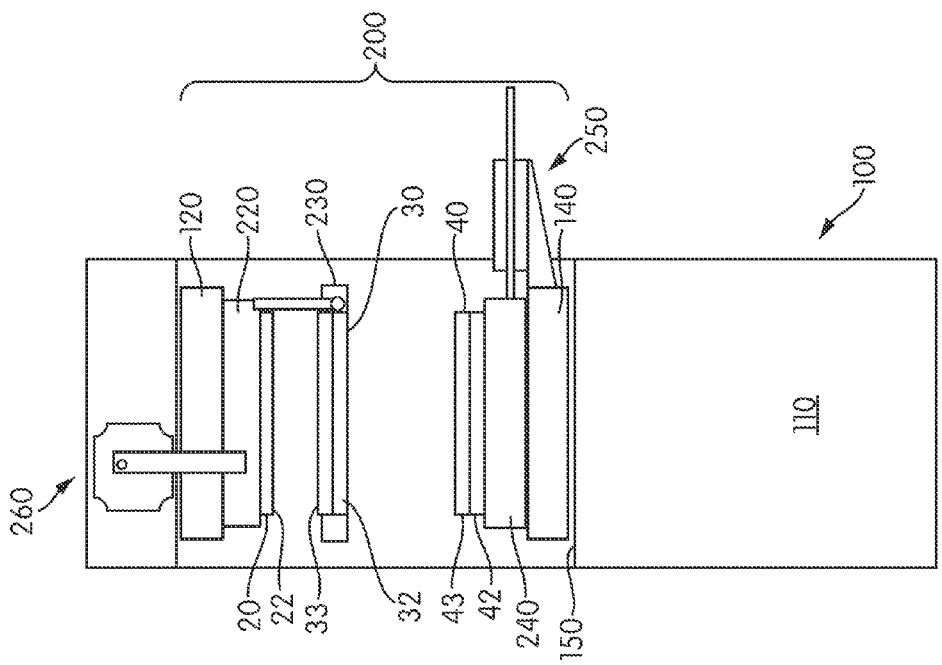
FIGS. 19 through 25 are schematic views of a molding assembly showing various steps in a molding process according to an embodiment of the invention.

Referring now to FIG. 19, in a first stage of the molding process, mold portions 20, 30 and/or 40 may be provided and engaged with or affixed, respectively, to mold carriers 220, 230 and/or 240. As shown in FIG. 19, the lower platen 140 may be driven upward such that mold portions 30 and 40 are pressed closed and mold cavities defined between primary and auxiliary mold plates 32, 33 and between primary and auxiliary mold plates 42, 43 are formed and closed. For an injection molding process, the material to-be-molded may be injected into the mold cavities formed by mold portions 30 and 40. For a compression molding process, the material to-be-molded may be placed within mold cavity surfaces 35a and 45 (see, e.g., FIGS. 23C and 23D) prior to closing the mold portions 30, 40. In the step of pressing mold portions 30 and 40 closed, mold portion 30 may be pressed against mold portion 20. (Again, spaces or gaps shown between the mold portions 20, 30, 40 in the schematic of FIG. 19 are for ease of understanding the figure.) Within the mold cavities, the molding material sets or at least partially cures to form first-stage molded parts.

Figure 20:
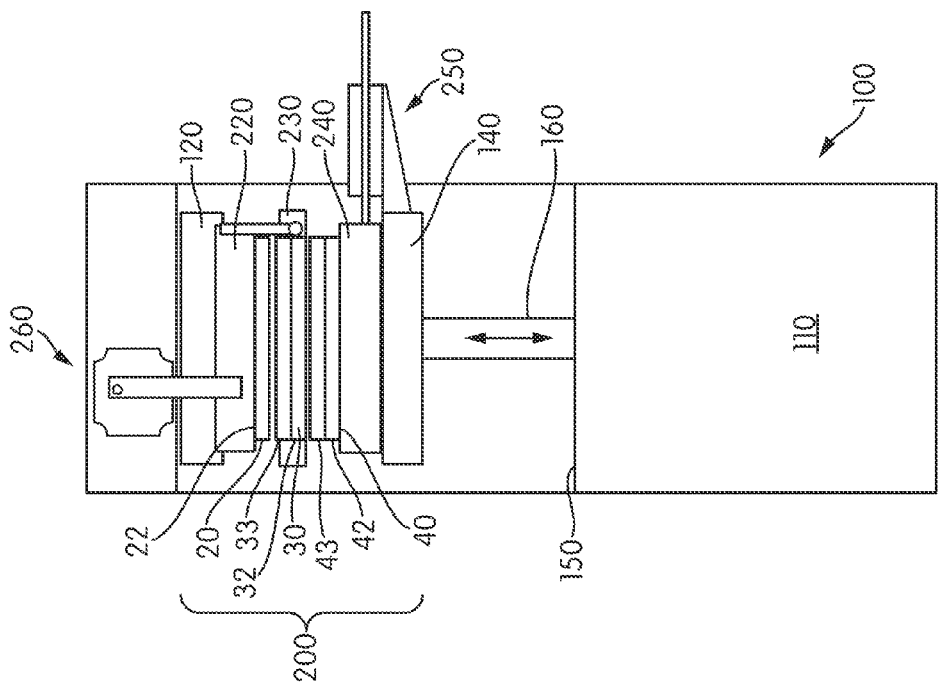

In FIG. 20, similar to the process steps described above with respect to FIGS. 4A and 4B, the lower platen 140 (with lower mold carrier 240 and lower mold portion 40 located thereon) is moved downward and middle mold carrier 230 and middle mold portion 30 moves away from or is displaced from upper mold carrier 220 and upper mold portion 20. The separation of mold portion 30 from mold portion 20 may be due to gravity. Optionally, spring elements (not shown) may assist in this separation.

Figure 21:
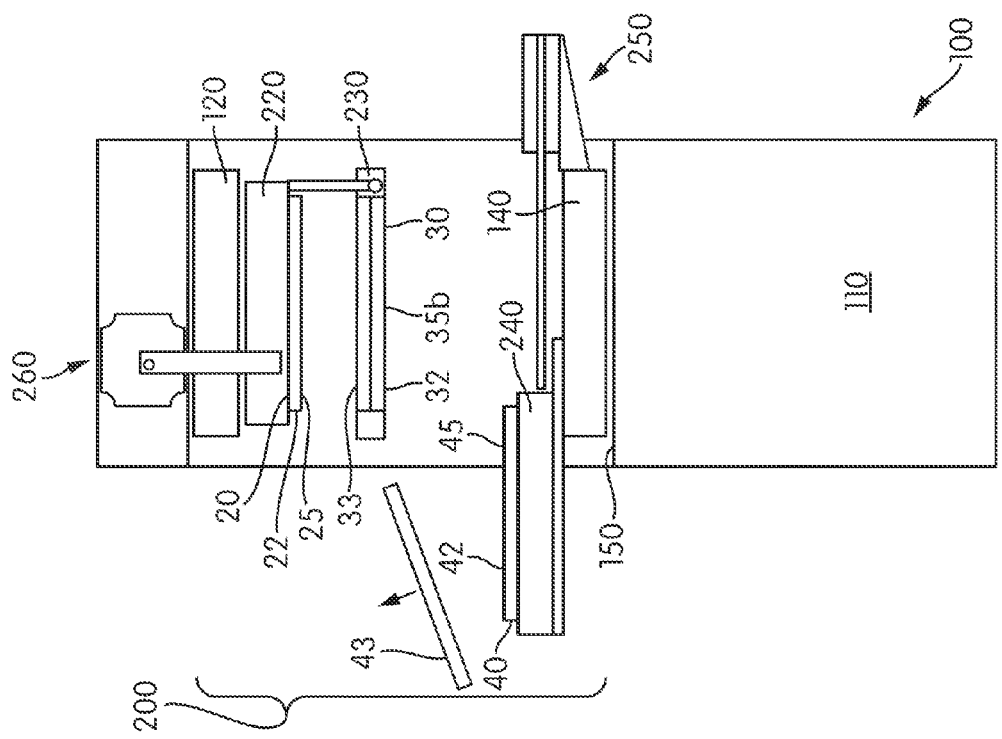

In FIG. 21, similar to the process steps described above with respect to FIGS. 5A through 6B, the lower mold carrier 240 and lower mold portion 40 thereon displaces, at least partially, out from between the platens 120 and 140. This displacement may be generally horizontal, although non-horizontal motion components may be provided. Further, the displacement may be a sliding motion and the sliding motion may be linear, although non-linear sliding motions may be accommodated. As shown in FIG. 21, the auxiliary mold plate 43 is removed, exposing mold cavity surfaces 45 and the molded parts therein. In this embodiment, these lower molded part(s) are not removed from the portion of the lower mold cavity defined by mold cavity surface 45.

In FIG. 22, similar to the process steps described above with respect to FIGS. 7A through 8B, the upper mold carrier 220 with the upper mold portion 20 may pivot, at least partially, out from between the platens 120 and 140. In conjunction with this pivoting motion, middle mold carrier 230 with middle mold portion 30 also moves to an accessing position that is, at least partially, out from between the platen 120, 140. Movement of middle mold portion 30 from the molding position to the accessing position may be accomplished as described with respect to any of the embodiments presented above and variations thereof, as would be apparent to persons of ordinary skill in the art given the benefit of the broadly disclosed aspects of the invention presented herein. The auxiliary mold plate 33 is removed, exposing mold cavity surfaces 35a and the middle molded parts therein. In this embodiment, these middle molded part(s) are not removed from the portion of the middle mold cavity formed by mold cavity surface 35a.

FIG. 23A is a schematic front view of the molding machine 100 and the molding assembly 200 with the mold carriers 220, 230 and 240 and the mold portions 20, 30 and 40 in their accessing position. Specifically, mold plates 22, 32, 42 are carried by the mold carriers 220, 230, 240, respectively. Mold cavity surface 25 is shown in the lower surface of the mold plate 22 of upper mold portion 20. FIG. 23B is a view of the mold cavity surface 35a provided in the upper surface of the mold plate 32 of mold portion 30 as would be seen at section line B-B of FIG. 23A. FIG. 23C is a view of the mold cavity surface 35b provided in the lower surface of the mold plate 32 of mold portion 30 as would be seen at section line C-C of FIG. 23A. FIG. 23D is a view of the mold cavity surface 45 provided in the upper surface of the mold plate 42 of mold portion 40 as would be seen at section line D-D of FIG. 23A. Thus, it can be seen that the middle mold portion 30 may define a first mold cavity surface 35a on a first surface and further may define a second mold cavity surface 35b on a second surface opposite the first surface.

Figure 24:
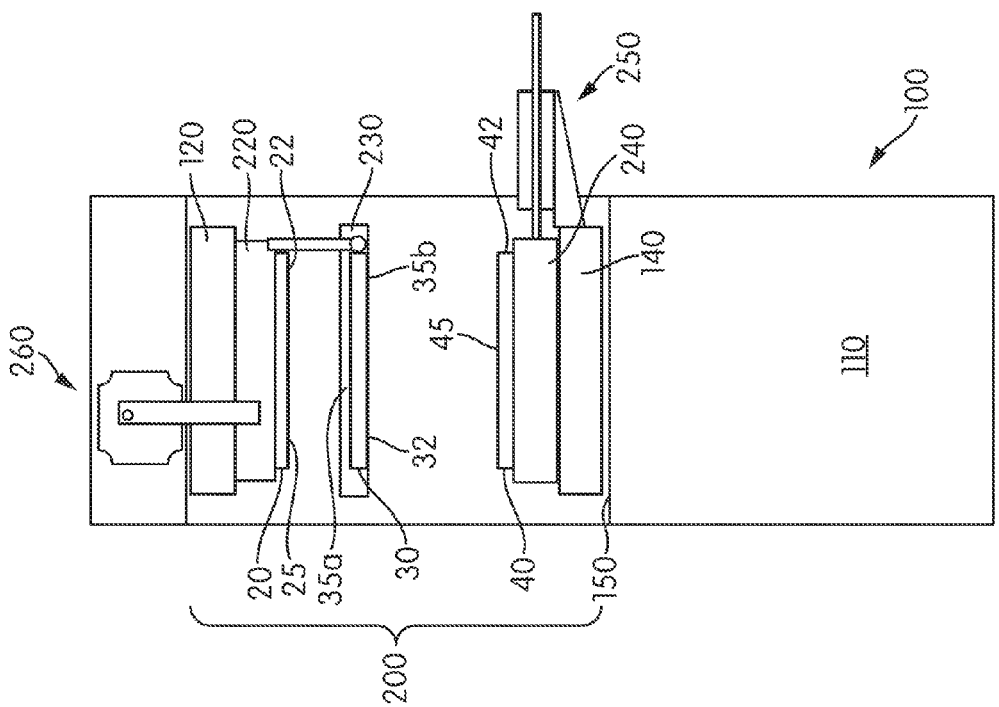

In FIG. 24, the steps of FIGS. 21 and 22 have been reversed. As such, upper mold carrier 220 and middle mold carrier 230, with their respective mold portions 20 and 30 have been moved from their accessing positions back to within the platen volume 150. Lower mold carrier 240 with its respective mold portion 40 has also been moved back within the platen volume 150. In FIG. 24, all three mold carriers 220, 230, 240 and all three mold portions 20, 30, 40 are shown oriented in parallel to one another and vertically aligned with one another.

Figure 25:
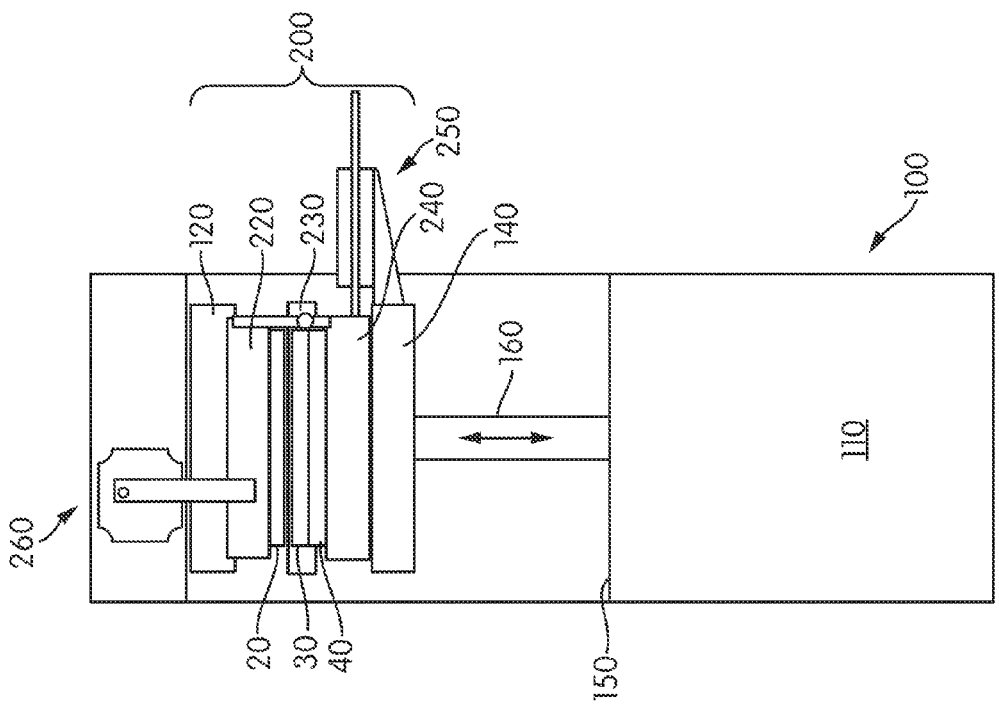

In FIG. 25, the lower platen 140 has been driven upward and mold portions 20, 30 and 40 are pressed together between the upper and lower platen 120, 140. Specifically, upper mold portion 20 and middle mold portion 30 are pressed together such that complementary mold cavity surfaces 25 and 35a are aligned and a second-stage upper/middle mold cavity is formed between these two mold portions. Within this second-stage upper/middle mold cavity, the middle molded part formed during the first stage of the molding process lies within mold cavity surface 35a and partially fills the second-stage upper/middle mold cavity. Similarly, middle mold portion 30 and lower mold portion 40 are pressed together such that complementary mold cavity surfaces 35a and 45 are aligned. A second-stage middle/lower mold cavity is formed between these two mold portions. Within this second-stage middle/lower mold cavity, the lower molded part formed during the first stage of the molding process lies within mold cavity surface 45 and partially fills the second-stage middle/lower mold cavity.

The material to-be molded during the second stage of the molding process may be injected or introduced into the second-stage mold cavities after the second-stage mold portions are closed as shown in FIG. 25. Alternatively, the material to-be-molded during the second stage of the molding process may be set or introduced into the second-stage mold cavities while the second-stage mold cavities are open and the mold portions 30, 40 are in the accessing position (i.e., at least partially outside the platen volume 150).

After the material has set, cured, at least partially cured, etc., the mold carriers 220, 230, 240 may be articulated into the accessing positions as described above. The final two-stage molded parts may be safely, ergonomically, and efficiently be removed from the accessible mold portions by the mold operator and the process may start anew.

The above-described molding apparatus may be utilized for both injection and compression molding using conventional existing mold processes. For example, the material used to form the molded parts may be poured, injected, inserted or otherwise placed or introduced into the molding cavities. Heat (or optionally, cooling) may be applied to the material within molding assembly 200. The material is allowed to set. The molding assembly 200 may then be articulated so that the open mold cavities are presented to a mold operator and the molded parts may be removed from mold portions 20, 30, 40. Further, the above-described mold and molding processes may be used in retrofit or in new machinery.

Likewise, the characteristics of the mold and molding process described herein allow it to be used in a number of manufacturing scenarios and molding techniques. For example, as will be seen from that described, the current mold and molding process may be utilized in, for example, injection molding, compression molding and open-cell molding, to name a few. Further, the mold and molding process described may be used in hybrid or combinations of tradition molding techniques as are known in the art. For example, certain parts may be formed in a more "open-celled" injection molding process than a traditional injection molding process. Accordingly, preferred molding characteristics and a wider variety of products with unique traits, dimensions, characteristics, thickness or thinness or the like are possible.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. An apparatus for molding articles, the apparatus comprising:
   a first mold carrier coupled to a fixed structure and configured to angularly displace relative to the fixed structure from a first molding position to a first accessing position;
   a second mold carrier traveling with the first mold carrier and configured to angularly displace relative to the first mold carrier from a second molding position to a second accessing position; and
   a third mold carrier configured to move from a third molding position in a first direction toward the first mold carrier when the first mold carrier is in the first molding position, and configured to move in a second direction transverse to the first direction to a third accessing position, and
   wherein the second mold carrier is located between the first mold carrier and the third mold carrier when the first mold carrier is in the first molding position and when the third mold carrier is in the third molding position.

2. The apparatus of claim 1, wherein a pivoting mechanism couples the first mold carrier to the fixed structure and wherein a connecting member slidably and rotatably couples the second mold carrier to the first mold carrier.

3. The apparatus of claim 1, further comprising:
   a first platen, a second platen, and a platen volume defined therebetween,
   wherein the first mold carrier in the first molding position is located within the platen volume and in the first accessing position is located at least partially outside the platen volume,
   wherein the second mold carrier in the second molding position is located within the platen volume and in the second accessing position is located at least partially outside the platen volume, and
   wherein the third mold carrier in the third molding position is located within the platen volume and in the third accessing position is located at least partially outside the platen volume.

4. The apparatus of claim 1,
   wherein the second mold carrier in the second accessing position is oriented approximately horizontally.

5. The apparatus of claim 1,
   wherein the first mold carrier angularly displaces relative to the fixed structure around a first axis fixed to the fixed structure, and
   wherein the second mold carrier angularly displaces relative to the first mold carrier around a second axis associated with the first mold carrier.

6. The apparatus of claim 5,
   wherein the first mold carrier angularly displaces in a clockwise direction around the first axis and wherein the second mold carrier angularly displaces in a counter-clockwise direction around the second axis.

7. The apparatus of claim 1, further comprising:
   a drive unit to angularly displace the first mold carrier relative to the fixed structure; and
   an articulation mechanism to control the relative motion of the second mold carrier relative to the first mold carrier as the first mold carrier angularly displaces relative to the fixed structure.

8. The apparatus of claim 7, wherein the articulation mechanism includes at least one connecting member coupled to the first and second mold carriers and configured to allow relative linear displacement therebetween.

9. The apparatus of claim 8, wherein the articulation mechanism further includes at least two linkage members extending between the fixed structure and the second mold carrier.

10. The apparatus of claim 8, wherein the articulation mechanism further includes a rotation joint between the at least one connecting member and the second mold carrier.

11. The apparatus of claim 10, further comprising:
    a displacement guide member provided on the third mold carrier and a complementary guided element provided on the second mold carrier, the complementary guided element configured for relative displacement along the displacement guide member.

12. An apparatus for molding articles, the apparatus comprising:
    a fixed structure;
    an articulated mold assembly attached thereto,
      wherein the articulated mold assembly includes:
        a first mold carrier rotatably coupled to a pivotable member,
        a second mold carrier traveling with the first mold carrier, and
        a third mold carrier configured to move in a first direction toward the first mold carrier and in a second direction transverse to the first direction,
      wherein the second mold carrier is positioned between the first and third mold carriers,
      wherein the pivotable member is configured to be pivoted around a first axis associated with a fixed structure, and
      wherein the at least one mold carrier is rotatably coupled around a second axis associated with the pivotable member, the second axis being distinct from the first axis.

13. The apparatus of claim 12, wherein the second axis is slidably coupled to the pivotable member.

14. The apparatus of claim 12, further including:
    a movable platen is configured to move in the first direction toward a fixed platen.

* * * * *